(12) United States Patent
Kim et al.

(10) Patent No.: US 12,249,718 B2
(45) Date of Patent: Mar. 11, 2025

(54) NEGATIVE ELECTRODE AND SECONDARY BATTERY INCLUDING NEGATIVE ELECTRODE

(71) Applicant: LG Energy Solution, Ltd., Seoul (KR)

(72) Inventors: Tae Gon Kim, Daejeon (KR); Ki Won Sung, Daejeon (KR); Wang Mo Jung, Daejeon (KR); Sin Young Park, Daejeon (KR); Dae Jin Lee, Daejeon (KR); Bo Ram Lee, Daejeon (KR); Hak Yoon Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 741 days.

(21) Appl. No.: 17/435,820

(22) PCT Filed: Mar. 9, 2020

(86) PCT No.: PCT/KR2020/003269
§ 371 (c)(1),
(2) Date: Sep. 2, 2021

(87) PCT Pub. No.: WO2020/184938
PCT Pub. Date: Sep. 17, 2020

(65) Prior Publication Data
US 2022/0158192 A1    May 19, 2022

(30) Foreign Application Priority Data

Mar. 8, 2019 (KR) .......... 10-2019-0027162
Oct. 4, 2019 (KR) .......... 10-2019-0123302

(51) Int. Cl.
*H01M 4/62* (2006.01)
*H01M 4/48* (2010.01)
*H01M 4/02* (2006.01)

(52) U.S. Cl.
CPC ............. *H01M 4/625* (2013.01); *H01M 4/48* (2013.01); *H01M 2004/021* (2013.01); *H01M 2004/027* (2013.01)

(58) Field of Classification Search
CPC .. H01M 4/625; H01M 4/48; H01M 2004/021; H01M 2004/027
See application file for complete search history.

(56) References Cited

U.S. PATENT DOCUMENTS

| | | | |
|---|---|---|---|
| 6,183,714 B1 | 2/2001 | Smalley et al. | |
| 2009/0042100 A1* | 2/2009 | Tanaka | H01M 10/4235 429/246 |

(Continued)

FOREIGN PATENT DOCUMENTS

| | | |
|---|---|---|
| CN | 106531992 A | 3/2017 |
| CN | 107204484 A | 9/2017 |

(Continued)

OTHER PUBLICATIONS

Search report from International Application No. PCT/KR2020/003269, mailed Jun. 18, 2020.

(Continued)

*Primary Examiner* — Maria Laios
*Assistant Examiner* — Ziheng Lu
(74) *Attorney, Agent, or Firm* — Lerner David LLP

(57) ABSTRACT

A negative electrode includes a negative electrode active material layer, wherein the negative electrode active material layer includes a negative electrode active material and a conductive material. The negative electrode active material includes $SiO_x$ ($0 \leq x < 2$) particles and the conductive material includes secondary particles in which a portion of one graphene sheet is connected to a portion of an adjacent graphene sheet and a carbon nanotube structure in which 2 to 5,000 single-walled carbon nanotube units are coupled to (Continued)

each other, wherein the oxygen content of the secondary particles is 1 wt % to 10 wt % based on the total weight of the secondary particles, the specific surface area of the secondary particles measured by a nitrogen adsorption BET method is 500 m²/g to 1100 m²/g, and the carbon nanotube structure is included in the negative electrode active material layer in an amount of an 0.01 wt % to 1.0 wt %.

20 Claims, 7 Drawing Sheets

(56) References Cited

U.S. PATENT DOCUMENTS

| | | | |
|---|---|---|---|
| 2012/0107683 A1 | 5/2012 | Kim et al. | |
| 2014/0079932 A1* | 3/2014 | Aksay | B82Y 30/00 |
| | | | 428/220 |
| 2014/0127567 A1* | 5/2014 | Kuriki | H01G 11/42 |
| | | | 427/126.3 |
| 2015/0104712 A1* | 4/2015 | Kerlau | H01M 4/661 |
| | | | 429/233 |
| 2016/0111718 A1* | 4/2016 | Figgemeier | H01M 4/1395 |
| | | | 252/507 |
| 2016/0200581 A1 | 7/2016 | Lee et al. | |
| 2017/0047584 A1 | 2/2017 | Hwang et al. | |
| 2017/0237127 A1* | 8/2017 | Ishikawa | H01G 11/52 |
| | | | 429/234 |
| 2017/0288216 A1* | 10/2017 | Kamo | H01M 4/483 |
| 2017/0317336 A1 | 11/2017 | Zhamu et al. | |
| 2017/0352868 A1* | 12/2017 | Zhamu | H01M 4/623 |
| 2018/0174766 A1 | 6/2018 | Zhamu et al. | |
| 2018/0190986 A1 | 7/2018 | Zhang et al. | |
| 2018/0219212 A1* | 8/2018 | Seol | H01M 4/364 |
| 2018/0261839 A1* | 9/2018 | Takeuchi | H01M 4/48 |
| 2019/0036186 A1* | 1/2019 | Kim | H01M 4/8867 |
| 2020/0006772 A1* | 1/2020 | Yu | H01M 4/139 |
| 2020/0335794 A1 | 10/2020 | Kim et al. | |

FOREIGN PATENT DOCUMENTS

| | | | |
|---|---|---|---|
| CN | 107634184 A | * | 1/2018 |
| CN | 107819154 A | | 3/2018 |
| CN | 107946561 A | | 4/2018 |
| CN | 107946570 A | | 4/2018 |
| EP | 0854839 A1 | | 7/1998 |
| EP | 3933985 A1 | | 1/2022 |
| JP | 2017084759 A | | 5/2017 |
| KR | 101113976 B1 | | 3/2012 |
| KR | 20150128432 A | | 11/2015 |
| KR | 20150128592 A | | 11/2015 |
| KR | 20160025547 A | | 3/2016 |
| KR | 101648139 B1 | | 8/2016 |
| KR | 20170069153 A | * | 6/2017 |
| KR | 20180022695 A | | 3/2018 |
| KR | 101937900 B1 | | 1/2019 |

OTHER PUBLICATIONS

Extended European Search Report including Written Opinion for Application No. 20770456.0 dated Feb. 23, 2022, pp. 1-12.
Lopez, C. G. et al., "Structure of sodium carboxymethyl cellulose aqueous solutions: A SANS and rheology study," Journal of Polymer Science Part B: Polymer Physics, Dec. 2014, pp. 492-501, vol. 53. XP055891394.

* cited by examiner (a)                            (b)

(A)

(B)

NEGATIVE ELECTRODE AND SECONDARY BATTERY INCLUDING NEGATIVE ELECTRODE

CROSS-REFERENCE TO RELATED APPLICATIONS

The present application is a national phase entry under 35 U.S.C. § 371 of International Application No. PCT/KR2020/003269 filed on Mar. 9, 2020, which claims priority to Korean Patent Application Nos. 10-2019-0027162, filed on Mar. 8, 2019, and 10-2019-0123302, filed on Oct. 4, 2019, the disclosures of all of which are incorporated herein in their entirety by reference.

TECHNICAL FIELD

The present invention relates to a negative electrode and a secondary battery including the same, the negative electrode including a negative electrode active material layer, wherein the negative electrode active material layer includes a negative electrode active material and a conductive material. The negative electrode active material includes $SiO_x$ ($0 \leq x < 2$) particles and the conductive material includes secondary particles in which a portion of one graphene sheet is connected to a portion of an adjacent graphene sheet and a carbon nanotube structure in which 2 to 5,000 single-walled carbon nanotube units are coupled to each other, wherein the oxygen content of the secondary particles is 1 wt % to 10 wt % based on the total weight of the secondary particles, the specific surface area of the secondary particles measured by a nitrogen adsorption BET method is 500 $m^2/g$ to 1100 $m^2/g$, and the carbon nanotube structure is included in the negative electrode active material layer in an amount of an 0.01 wt % to 1.0 wt %.

BACKGROUND ART

As technology development and demand for mobile devices have increased in recent years, the demand for secondary batteries as an energy source has been rapidly increased. Accordingly, various studies have been conducted on batteries which may meet various needs. In particular, research has been actively conducted on a lithium secondary battery having high energy density and excellent lifespan and cycle properties as a power source for such devices.

A lithium secondary battery means a battery including a positive electrode containing a positive electrode active material capable of intercalation/de-intercalation of lithium ions, a negative electrode containing a negative electrode active material capable of intercalation/de-intercalation of lithium ions, and a non-aqueous electrolyte containing lithium ions in an electrode assembly having a microporous separator interposed between the positive electrode and the negative electrode.

Meanwhile, since the conductivity of the negative electrode cannot be secured only with the negative electrode active material, there is a problem in that the resistance of the battery is too high. Therefore, typically, the negative electrode additionally includes a conductive material. Typically, a viscous conductive material such as carbon black is mainly used, and in order to improve the capacity of the battery by further improving conductivity, a linear conductive material is also used.

A single-walled carbon nanotube is one example of the linear conductive material and improves the conductivity in the negative electrode active material layer due to the elongated shape thereof. Therefore, typically, a negative electrode slurry is prepared through a dispersion obtained by completely dispersing the single-walled carbon nanotube, and then a negative electrode active material layer is prepared through the negative electrode slurry. However, when the charging and discharging of the battery is repeated, the surface of the single-walled carbon nanotube is damaged or the single-walled carbon nanotube is disconnected due to the excessive volume change of the negative electrode active material, so that there is a problem in that the conductive network in the negative electrode active material layer is difficult to be maintained. Accordingly, the conductive network is blocked or reduced, which deteriorates the lifespan properties of the battery.

Meanwhile, a graphene may be used as a planar conductive material. In the case of a graphene, the electrical conductivity thereof is excellent. However, even though it is advantageous to form a graphene as a single layer in order to improve conductivity, a process for manufacturing the same in the form of a single layer is very complicated, so that manufacturing cost is increased. On the other hand, when a graphene has a thickness greater than or equal to a desired level, there is a problem in that the effect of improving electrical conductivity is insufficient. In addition, even when a graphene having a thickness of a desired level of 10 nm or less is used as a conductive material, it is difficult to easily migrate in an electrolyte solution in a negative electrode due to the excessive surface contact of the graphene, so that the resistance of the negative electrode increases, resulting in the deterioration in the performance of a battery. In addition, due to a method for manufacturing graphene, the method which is commonly used, a graphene has a large-sized surface, and accordingly, the graphene is present while surrounding a wide portion of the surface of the negative electrode active material. In that case, since other conductive materials, such as carbon nanotube, are present by being mostly aggregated on the surface of the graphene rather than directly contacting the negative electrode active material, the entire conductive network of the negative electrode may not be smoothly formed.

Furthermore, when a silicon-based active material is used as the negative electrode active material, the volume of the silicon-based active material excessively expands due to the charge and discharge of the battery, thereby blocking or reducing the conductive path, which deteriorated the lifespan properties of the battery. The above-described typical conductive material does not significantly contribute to suppressing the blocking or reduction of the conductive path caused by the volume expansion of the silicon-based active material.

Therefore, there is a demand for a new negative electrode capable of improving the capacity and lifespan of a battery when a silicon-based active material is used.

DISCLOSURE OF THE INVENTION

Technical Problem

An aspect of the present invention provides a negative electrode and a secondary battery including the same, the negative electrode capable of improving the capacity and lifespan of a battery when a silicon-based active material is used.

Technical Solution

According to an aspect of the present invention, there is provided a negative electrode including a negative electrode active material layer, wherein the negative electrode active material layer includes a negative electrode active material and a conductive material. The negative electrode active material includes $SiO_x$ (0≤x<2) particles and the conductive material includes secondary particles in which a portion of one graphene sheet is connected to a portion of an adjacent graphene sheet and a carbon nanotube structure in which 2 to 5,000 single-walled carbon nanotube units are coupled to each other, wherein the oxygen content of the secondary particles is 1 wt % to 10 wt % based on the total weight of the secondary particles, the specific surface area of the secondary particles measured by a nitrogen adsorption BET method is 500 m²/g to 1100 m²/g, and the carbon nanotube structure is included in the negative electrode active material layer in an amount of an 0.01 wt % to 1.0 wt %.

According to another aspect of the present invention, there is provided a secondary battery including the negative electrode.

Advantageous Effects

According to the present invention, a negative electrode includes $SiO_x$ (0≤x<2) particles, so that the capacity of a battery may be improved. In addition, secondary particles and a carbon nanotube structure which are to be introduced in the present invention are used together as a conductive material, so that the conductivity in a negative electrode active material may be greatly improved. Furthermore, due to the content of oxygen which is rich in the secondary particles, the secondary particles may be uniformly dispersed in the negative electrode. Accordingly, despite the volume expansion of the $SiO_x$ (0≤x<2) particles, a conductive path is secured in the negative electrode, and the lifespan properties of the battery may be improved.

DETAILED DESCRIPTION

Figure 1:
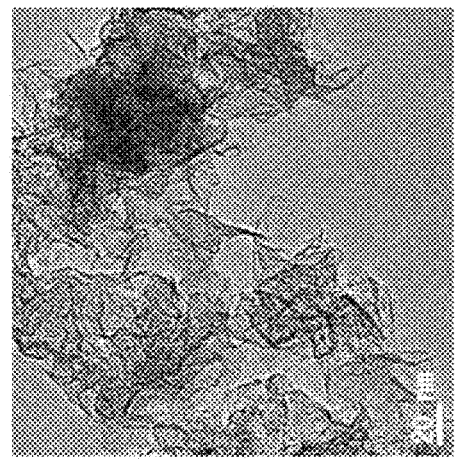
FIG. 1 is a schematic view and a TEM photograph showing a process of forming a graphene sheet included in secondary particles.
Figure 1:
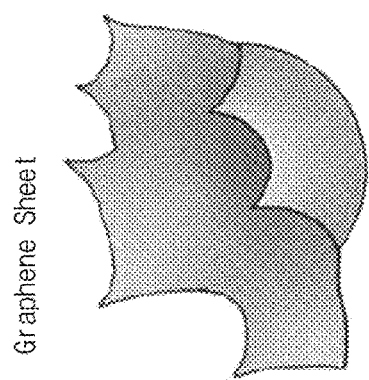
Figure 1:
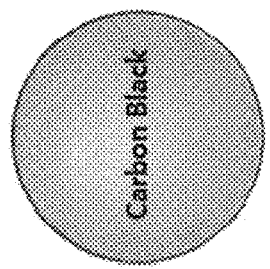

Hereinafter, the present invention will be described in more detail to facilitate understanding of the present invention. In this case, it will be understood that words or terms used in the specification and claims shall not be interpreted as having the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

In the present specification, a graphene sheet means a carbonaceous structure in the form of a thin film, which includes one or a plurality of laminated graphite surfaces and having flexibility.

In the present specification, the lateral size (nm) of a graphene sheet may be evaluated by measuring the size of 100 graphene sheets in a conductive material by a TEM (JEOL, JEM-2010F), followed by calculating the average thereof.

In the present specification, the nitrogen adsorption specific surface area (m²/g) may be derived by performing degassing for 8 hours at 200° C. using a BET measurement device (BEL-SORP-MAX, Nippon Bell) and then performing $N_2$ adsorption/desorption at 77 K to measure the specific surface area of a target material.

In the present specification, the iodine adsorption value (mg/g) may be measured according to an ASTM D1510 method.

In the present specification, the oxygen content (wt %) may be derived by measuring the content of C, H, N elements through an element analysis device (CHN-coder MT-5, Yanako) and then calculating the oxygen differential by reflecting the amount of residual ash.

In the present specification, the Raman spectrum D/G ratio may be measured by analyzing the Raman spectrum with an Ar-ion laser having a wavelength of 514.5 nm through a Raman spectroscopy analysis device (NRS-2000B, Jasco).

<Negative Electrode>

A negative electrode according to an embodiment of the present invention includes a negative electrode active material layer, wherein the negative electrode active material layer includes a negative electrode active material and a conductive material. The negative electrode active material includes $SiO_x$ (0≤x<2) particles and the conductive material includes secondary particles in which a portion of one graphene sheet is connected to a portion of an adjacent graphene sheet and a carbon nanotube structure in which 2 to 5,000 single-walled carbon nanotube units are coupled to each other, wherein the oxygen content of the secondary particles is 1 wt % to 10 wt % based on the total weight of the secondary particles, the specific surface area of the secondary particles measured by a nitrogen adsorption BET method is 500 m²/g to 1100 m²/g, and the carbon nanotube structure is included in the negative electrode active material layer in an amount of an 0.01 wt % to 1.0 wt %.

The negative electrode may include a negative electrode active material layer. More specifically, the negative electrode may include a current collector and a negative electrode active material layer disposed on the current collector. However, it is not intended to exclude the so-called "free-standing negative electrode" in which the negative electrode is composed of only a negative electrode active material layer without a current collector.

The current collector is not particularly limited as long as it has conductivity without causing a chemical change in a battery. For example, as the current collector, copper, stainless steel, aluminum, nickel, titanium, fired carbon, or aluminum or stainless steel that is surface-treated with one of carbon, nickel, titanium, silver, and the like may be used. Specifically, a transition metal which adsorbs carbon such as copper and nickel well may be used as the current collector.

The negative electrode active material layer may be disposed on one surface or both surfaces of the current collector. Naturally, in the case of the free-standing negative electrode, the negative electrode active material layer may be a negative electrode itself without a current collector.

The negative electrode active material layer may include a negative electrode active material and a conductive material.

The negative electrode active material may include a silicon-based active material. As the silicon-based active material particles, at least one selected from the group consisting of $SiO_x$ ($0 \leq x < 2$) particles, an Si—C composite, and an Si—Y alloy (wherein Y is an element selected from the group consisting of an alkali metal, an alkaline earth metal, a transition metal, a Group 13 element, a Group 14 element, a rare earth element, and a combination thereof) may be used.

Specifically, the negative electrode active material may include $SiO_x$ ($0 \leq x < 2$) particles. When the negative electrode active material is $SiO_x$ ($0 \leq x < 2$) particles, the capacity of the battery may be increased. More specifically, the negative electrode active material may be SiO. In this case, during the charge/discharge of the battery, an excessive volume expansion of the negative electrode active material is controlled, so that the lifespan properties of the battery may be improved.

The average particle diameter ($D_{50}$) of the $SiO_x$ ($0 \leq x < 2$) particles may be 0.1 μm to 20 μm, specifically 1 μm to 10 μm. When the above range is satisfied, a side reaction between the SiO and an electrolyte solution is suppressed and a lithium silicate formation reaction of the $SiO_x$ ($0 \leq x < 2$) particles is controlled, thereby preventing the deterioration in initial efficiency and maximizing the implementation of initial capacity of a negative electrode design.

The negative electrode active material may further include a carbon-based active material. The carbon-based active material may include at least one selected from the group consisting of artificial graphite, natural graphite, and graphitized mesocarbon microbead. Specifically, it is preferable that the carbon-based active material is artificial graphite in that the volume expansion of the negative electrode may be smoothly controlled together with secondary particles (secondary particles included in a conductive material) to be described later.

The weight ratio of the $SiO_x$ ($0 \leq x < 2$) particles to the carbon-based active material may be 3:97 to 30:70, specifically 3:97 to 20:80. When the above range is satisfied, the excessive volume expansion of the $SiO_x$ ($0 \leq x < 2$) particles may be suppressed and the lifespan properties of the battery may be improved. In addition, it is most preferable that the weight ratio of the $SiO_x$ ($0 \leq x < 2$) particles to the carbon-based active material is in the above-described range when considering the use of secondary particles (secondary particles included in a conductive material) to be described later and a carbon nanotube structure.

The conductive material may include secondary particles in which a portion of one graphene sheet is connected to a portion of an adjacent graphene sheet, and a carbon nanotube structure.

(1) Secondary Particles

The secondary particles may include a structure in which a plurality of graphene sheets are connected. Specifically, the secondary particles may at least have two or more graphene sheets are directly or indirectly connected to each other.

The secondary particles may include a structure in which a portion of one graphene sheet is connected to a portion of an adjacent graphene sheet. More specifically, the plurality of graphene sheets may be connected to each other to form secondary particles in the form of a long chain. For example, the secondary particles in the form of a chain may partially include a region in which the plurality of graphene sheets are aggregated. Since the secondary particles have a unique chain-shape connection structure, the secondary particles are excellent in electrical conductivity and thermal conductivity.

Typical planar-form graphenes have a two-dimensional arrangement because the thickness of a surface thereof is smaller than the width of the surface thereof. Accordingly, a conductive network formed in a negative electrode is mostly formed based on the two-dimensional arrangement. On the other hand, the graphene sheets included in the secondary particles include a plurality of graphene sheets having an irregular arrangement. Specifically, the graphene sheets included in the secondary particles include a plurality of graphene sheets in different directions (directions perpendicular to a surface of graphene sheets). That is, the secondary particles may have a three-dimensional arrangement formed by graphene sheets arranged in various directions and connected to each other. More specifically, since the graphene sheets have a chain shape arranged long to have a predetermined length while having the three-dimensional arrangement, a conductive network formed in the negative electrode may be formed based on the three-dimensional arrangement. Accordingly, it is possible to form a conductive network in various directions, and a conductive connection between a carbon nanotube structure to be described later and the secondary particles may also be effectively formed, so that the conductivity in the negative electrode may be greatly improved. Particularly, when used together the carbon nanotube structure to be described later, since the graphene sheets of the secondary particles have various directional properties, the carbon nanotube structure connected to the graphene sheet may also be present in the negative electrode in various directions. Accordingly, a conductive network in the negative electrode may be more effectively formed. Here, the graphene sheet may include a plurality of graphene sheets arranged in the same direction, but even in such a case, the graphene sheet also includes a plurality of graphene sheets arranged in different directions.

Meanwhile, since the $SiO_x$ ($0 \leq x < 2$) particles are included in the negative electrode active material, the capacity of the battery may be greatly improved. However, the $SiO_x$ ($0 \leq x < 2$) particles are less conductive than graphite and the like, and have a problem in that the volume thereof excessively expands during charging/discharging of the battery, thereby deteriorating the performance of the battery. In this regard, since the conductive material includes the secondary particles, the contact between the negative electrode active material and the secondary particles may be improved, and due to the carbon nanotube structure disposed by being dispersed in various directions by the secondary particles, the problem of conductivity deterioration caused by the shrinkage/expansion of the $SiO_x$ ($0 \leq x < 2$) particles may be compensated. Furthermore, although the secondary particles are dispersed through an aqueous solvent, the secondary particles may be present by being uniformly dispersed by the presence of an oxygen functional group rich in the secondary particles. Accordingly, the problem of conductivity deterioration due to the use of the $SiO_x$ ($0 \leq x < 2$) particles may be greatly prevented, and during the charging/discharging of the battery, lifespan degradation may be minimized, so that battery performance may be improved. Furthermore, the secondary particles serve as a hub between the carbon nanotube structures, so that conductivity may be further improved.

The secondary particles may further include a connection portion connected to at least some graphene sheets among the plurality of graphene sheets. In the present invention, when the secondary particles are prepared, conductive particles such as carbon black are ruptured due to continuous oxidation, thereby forming the graphene sheet, and there may also be a portion which maintains its original shape without being ruptured. At this time, the portion maintaining the shape may correspond to the connection portion. Therefore, the connecting portion may be in a non-graphene form, and the non-graphene form may refer to a mass form having a thickness greater than that of the graphene sheet described above.

A portion of each of the plurality of graphene sheets may be directly connected to each other. Alternatively, at least some graphene sheets among the plurality of graphene sheets may be connected to each other through the connection portion, and specifically, at least the portion of each of the plurality of graphene sheets may be connected to the connection portion. The conductive material of the present invention may include both the connection methods.

The secondary particles may be formed by modifying the shape of carbon black in a particle form close to a spherical shape, such as acetylene black, furnace black, thermal black, channel black, and lamp black, by an oxidation process. Referring to the schematic view of FIG. 1, the tissue structure of carbon black may be modified by an oxidation process to form particles including a plurality of graphene sheets. When the carbon black is a secondary particle form, a secondary particle shape in which the particles including the plurality of graphene sheets are aggregated may be formed.

The average thickness of the graphene sheets may be nm or less, specifically 0.34 nm to 10 nm, ore specifically, from 0.34 nm to 5 nm. When the above range is satisfied, flexibility properties which are unique to a graphene sheet may be exhibited, and the surface contact by the graphene sheet may be improved so that the electrical conductivity of the secondary particles may be excellent. The graphene sheet may be in the form in which 10 or less graphene layers are laminated.

The lateral size of the graphene sheet may be 300 nm or less, specifically 10 nm to 300 nm, more specifically, 10 nm to 100 nm, and may be, for example, 50 nm to 90 nm. The longest length of the graphene sheet may be controlled according to the degree of heat treatment. For example, the lateral size of a graphene sheet may be controlled by additionally performing separate heat treatment in an inert atmosphere after an oxidation treatment process. When the above range is satisfied, ions in the electrolyte solution may be smoothly diffused in the negative electrode. Accordingly, the rapid charge properties of the battery may be improved and rate properties may also be improved. The lateral size of the graphene sheet means the average of the lateral sizes of 100 graphene sheets observed through an SEM or a TEM. Here, the lateral size represents the length of the longest line, assuming there is a line connecting one point to another point in one graphene sheet.

The lateral size of the graphene sheet is much smaller than the lateral size of a common graphene. A graphene having a large lateral size, which is typically used as a conductive material excessively surrounds the surface of a negative electrode active material, so that the direct contact between the carbon nanotube structure and the negative electrode active material is hindered. On the other hand, the graphene sheet of the secondary particles used in the present invention has a small lateral size, and thus, does not hinder the direct contact between the carbon nanotube structure and the negative electrode active material, so that a conductive network may be smoothly formed for the amount of a conductive material applied, and the resistance of the negative electrode is effectively reduced. Particularly, the resistance to the movement of an electrolyte solution in the negative electrode may be effectively reduced. The above feature shows that a common graphene and the secondary particles introduced in the present invention form a conductive network with completely different mechanisms, which means they are completely different materials.

The oxygen content of the secondary particles may be 1 wt % or greater based on the total weight of the secondary particles, specifically 1 wt % to 10 wt %. When the above range is satisfied, the dispersion of the secondary particles in a negative electrode slurry formed during the manufacturing of a negative electrode may be smoothly performed, so that the conductivity of the negative electrode may be improved, and the capacity of a manufactured battery may be increased. The oxygen content may be measured by a C, H, O, N elemental analysis method.

The oxygen content may be achieved in the process of performing oxidation treatment on carbon black. Specifically, an oxygen-containing functional group may be formed on the surface of the secondary particle by the oxidation treatment. The oxygen-containing functional group may be at least one selected from the group consisting of a carboxyl group, a hydroxy group, a carbonyl group, and the like. After the oxidation treatment process, the oxygen content may be additionally controlled by performing heat treatment on a conductive material in an inert atmosphere.

The secondary particles are prepared by oxidizing carbon black composed of a plurality of primary particles, thereby having a unique shape including a plurality of graphene sheets generated by the rupture of spherical primary particles. Accordingly, the secondary particles have both carbon black properties and graphene properties to some degree at the same time, and may have a surface oxygen functional group rich in the secondary particles during the oxidation process. Accordingly, due to the properties of carbon black, the secondary particles may solve the low de-lamination and poor dispersion problems of a typical graphene, and may maintain high electrical conductivity properties of a thin graphene sheet. Also, when the secondary particles are used together with the carbon nanotube structure, the surface oxygen functional group rich in the secondary particles may suppress a mutual aggregation phenomenon (aggregation of the carbon nanotube structure and the secondary particles) by n-n stacking due to a homogeneous $sp^2$ carbon surface structure, thereby also contributing to the dispersibility of the carbon nanotube structure, so that a conductive network in the negative electrode may be more closely formed.

The secondary particles may have a high degree of graphitization compared to carbon black before performing oxidation treatment. Specifically, high structural stress generated by the surface tension of the carbon black is partially relived when graphene sheets are formed, so that the degree of graphitization of the prepared secondary particles may be increased.

The secondary particles may have a D/G peak ratio of 2.0 or less when measuring the Raman spectrum, specifically 0 to 2.0, more specifically 0.9 to 2.0, and may be, for example, 1.1 to 1.8. In the Raman spectrum, a G peak near 1590 $cm^{-1}$ is due to an $E_{2g}$ vibrational mode of a $sp^2$ coupling of carbon, and a D peak near 1350 cm$^{-1}$ appears when there is a defect in the sp$^2$ coupling of carbon. That is, when the above D/G peak ratio is satisfied, a high degree of graphitization may be obtained, and accordingly, when the secondary particles are used as a conductive material, the capacity and electrical properties of the battery may be improved due to the high electric conductivity of the secondary particles.

The secondary particles may have a value of 0.2 or less as calculated by Equation 1 below, specifically 0 to 0.15, more specifically 0 to 0.1.

$$\frac{|b-a|}{a} \quad \text{[Equation 1]}$$

In Equation 1, a is the specific surface area (m$^2$/g) of the secondary particles measured by a nitrogen adsorption BET method and b is the iodine adsorption value (mg/g) of the secondary particles. When the secondary particles include a pore structure thereinside or between particles, a number of small-sized nitrogen (N$_2$) molecules may be adsorbed inside pores. On the other hand, iodine (I$_2$), which is a relatively large molecule, is less likely to enter the pores compared to nitrogen, so that an iodine adsorption value is not large. That is, when a pore structure is present, a value according to Equation 1 above increases. In other words, in the conductive material of the present invention, when a value according to Equation 1 above is 0.2 or less, it means that the secondary particles do not include micropores or contain the same in a minimal amount. That is, when there are no pores or pores are present in a minimal amount, the degree of iodine adsorption and the degree of nitrogen adsorption are similar, so that the value of Equation 1 above decreases. This means that the surface of the secondary particles is a free surface. Specifically, most of the carbon black is changed into a hollow structure by oxidation treatment, and as the structure is destroyed by continuous oxidation treatment, graphene sheets are formed. At this time, since the pore structure is not formed, the graphene sheets may be formed in an open shape facing the outside.

The specific surface area (m$^2$/g) of the secondary particles measured by a nitrogen adsorption BET method may be 500 m$^2$/g or greater, specifically 500 m$^2$/g to 1100 m$^2$/g, more specifically, 500 m$^2$/g to 900 m$^2$/g. When the specific surface area range is satisfied, it means that the graphene sheets are present in the secondary particles in various directions, and accordingly, even if the content of the secondary particles in the negative electrode is small, the conductivity of the negative electrode may be ensured.

The secondary particles may be included in the negative active material layer in an amount of 0.01 wt % to 2.0 wt %, specifically 0.05 wt % to 1.5 wt %, more specifically 0.1 wt % to 1.0 wt %. When the above range is satisfied, the negative electrode adhesive force and electrical conductivity may be greatly improved even with the application of a small secondary particle content, and the input/output properties and lifespan properties of the battery may be improved.

(2) Carbon Nanotube Structure

The carbon nanotube structure may include a plurality of single-walled carbon nanotube units. Specifically, the carbon nanotube structure may be a carbon nanotube structure in which 2 to 5,000 single-walled carbon nanotube units are coupled to each other side by side. More specifically, the carbon nanotube structure may be a carbon nanotube structure in which 2 to 4,500 single-walled carbon nanotube units are coupled to each other. Even more specifically, when considering the dispersibility of the carbon nanotube structure and the durability of the negative electrode, the carbon nanotube structure is most preferably a carbon nanotube structure in which 2 to 50, for example, 15 to 50 single-walled carbon nanotube units are coupled to each other The single-walled carbon nanotube units may be arranged and coupled side by side in the carbon nanotube structure (a cylindrical structure in which the long axis of the units are coupled in parallel to each other, thereby having flexibility) to form the carbon nanotube structure. The carbon nanotube structures may be connected to each other in the negative electrode active material layer and exhibit a network structure.

In a typical negative electrode including a common carbon nanotube, a bundle-type or entangled-type carbon nanotube (a form in which or a single-walled carbon nanotube unit or a multi-walled carbon nanotube unit are attached to each other or entangled with each other) is dispersed in a dispersion medium to prepare a conductive material dispersion, and then a negative electrode active material layer is prepared using the conductive material dispersion. At this time, the carbon nanotube is completely dispersed in a typical conductive material dispersion and becomes present as the conductive material dispersion in which carbon nanotube units of a single-strand form are dispersed. Due to the excessive dispersion process, the typical conductive material dispersion becomes in the form in which the carbon nanotube units are easily cut to have a length smaller than the initial length (for example, 3 μm or less), or are easily broken. Accordingly, since the units of a single-strand form cannot properly function as a buffer against pressure, it is difficult to prevent a negative electrode active material from being damaged (for example, broken and the like) in a rolling-pressing process when manufacturing a battery. In addition, due the small diameter and nature of being easily broken thereof, it is difficult for the single-walled carbon nanotube unit to secure a space between negative electrode active materials, and therefore, the porosity of the negative electrode active material layer is inevitably low. Accordingly, there is a problem in that the diffusion rate of lithium ions is decreased. Moreover, multi-walled carbon nanotube units are highly defective in structure due to the mechanism of node growth (having nodes due to defects occurring during a growth process instead of being smoothly linear). Accordingly, during a dispersion process, the multi-walled carbon nanotube units are more easily cut, and the multi-walled carbon nanotube units cut short by π-π stacking due to a carbon surface coupling structure (sp$^2$) are likely to aggregate with each other. Accordingly, the units are even more uniformly dispersed in a negative electrode slurry, and thus, are less likely to be present.

Figure 5A:
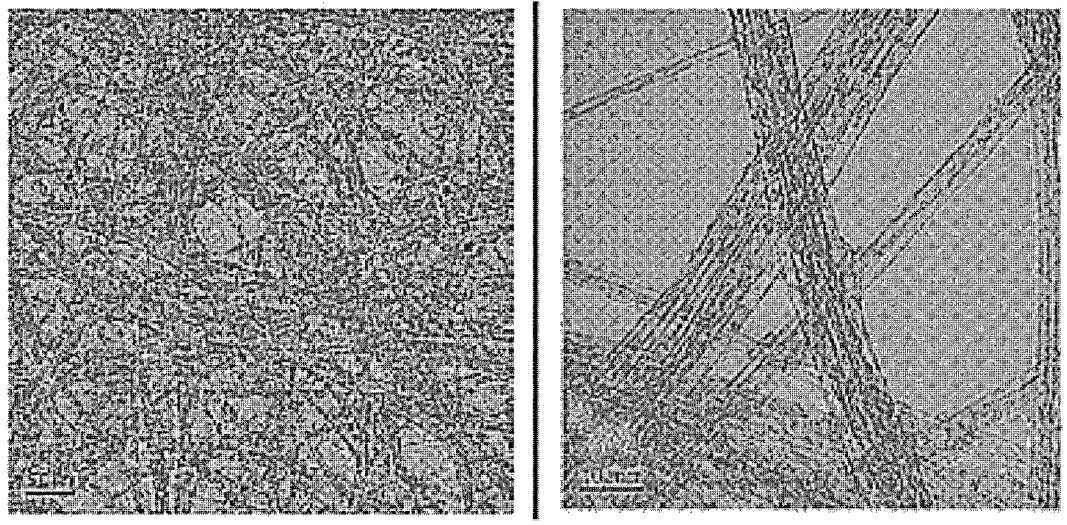
FIG. 5(A) is a TEM photograph of a carbon nanotube structure included in a negative electrode of an embodiment and FIG. 5(B) is a TEM photograph of a single-walled carbon nanotube unit according to Preparation Example 5.
Figure 5B:
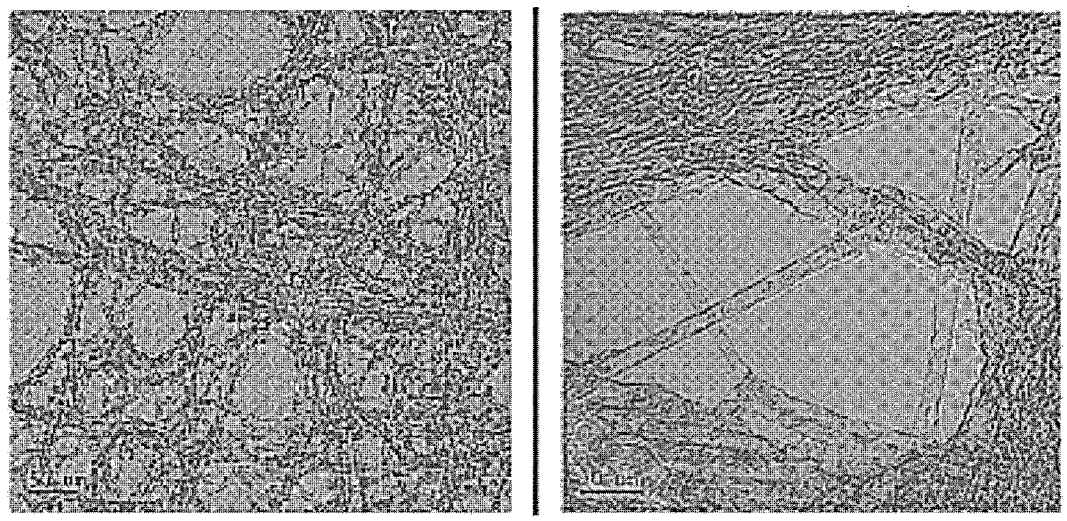

In contrast, the carbon nanotube structure included in the negative electrode active material layer of the present invention has a rope shape in which 2 to 5,000 of single-walled carbon nanotube units maintaining high crystallinity and having relatively no structural defects are arranged side by side and coupled to each other (see of FIG. 5(A)), and thus, maintains its length without being cut despite the volume change of the negative electrode active material, so that the conductivity of the negative electrode may be maintained even during a continuous charging and discharging process of the battery. In addition, due to the high electrical conductivity of single-walled carbon nanotube units having high crystallinity, the conductivity of the negative electrode is increased to reduce negative electrode resistance, and the energy density, lifespan properties, and rapid charge performance of the battery may be greatly improved. In addition, since the carbon nanotube structures may have be connected to each other to have a net structure in the negative electrode active material layer directly subjected to pressure during roll-pressing, damage to the negative electrode active material (for example, breakage phenomenon such as cracks) may be suppressed. In addition, even if a crack is generated in the negative electrode active material, the carbon nanotube structure connects the negative electrode active material across the crack, so that a conductive network may be maintained. Furthermore, since the carbon nanotube structure may maintain a long shape without being easily broken, the conductive network may be enhanced throughout the negative electrode active material layer. In addition, the de-intercalation of the negative electrode active material is suppressed, so that negative electrode adhesive force may be greatly improved.

In the carbon nanotube structure, the average diameter of the single-walled carbon nanotube units may be 0.5 nm to 5 nm, specifically 1 nm to 5 nm. When the above average diameter is satisfied, there is an effect of maximizing the conductivity in the negative electrode even with a minimal amount of a conductive material. The average diameter corresponds to an average value of the diameters of the top 100 single-walled carbon nanotube units having a large diameter and the bottom 100 single-walled carbon nanotube units having a small diameter when a manufactured negative electrode is observed through a TEM.

In the carbon nanotube structure, the average length of the single-walled carbon nanotube units may be 1 μm to 100 μm, specifically 5 μm to 50 μm. When the above average length is satisfied, a long conductive path for a conductive connection between the electrode active materials may be formed and a unique net structure may be formed, so that there is an effect of maximizing the conductivity in the negative electrode even with a minimal amount of a conductive material. The average length corresponds to an average value of the lengths of the top 100 single-walled carbon nanotube units having a large length and the bottom 100 single-walled carbon nanotube units having a small length when a manufactured negative electrode is observed through a TEM.

The specific surface area of the single-walled carbon nanotube units may be 500 m$^2$/g to 1,000 m$^2$/g, specifically 600 m$^2$/g to 800 m$^2$/g. When the above range is satisfied, a conductive path may be smoothly secured in the negative electrode active material layer due to a large specific surface area, so that there is an effect of maximizing the conductivity in the negative electrode active material layer even with a minimal amount of a conductive material. The specific surface area of the single-walled carbon nanotube units may be calculated from the adsorption amount of nitrogen gas at a liquid nitrogen temperature (77 K) using Belsorp-mini II of BEL Japan Co., Ltd.

The average diameter of the carbon nanotube structure may be 2 nm to 200 nm, specifically 5 nm to 150 nm, more specifically 8 nm to 20 nm. When the above range is satisfied, the carbon nanotube structure is smoothly dispersed, so that it is effective in forming a conductive network structure, and it is advantageous in connecting between negative electrode active materials, so that excellent electrical conductivity may be implemented. The average diameter corresponds to an average value of the diameters of the top 100 single-walled carbon nanotube units having a large diameter and the bottom 100 single-walled carbon nanotube units having a small diameter when a manufactured negative electrode is observed through a TEM.

The average length of the carbon nanotube structure may be 1 μm to 500 μm, specifically 5 μm to 100 μm, more specifically 6 μm to 20 μm. When the above range is satisfied, it is effective in forming a conductive network structure, and it is advantageous in connecting between negative electrode active materials, so that excellent electrical conductivity may be implemented. The average length corresponds to an average value of the lengths of the top 100 carbon nanotube structures having a large average length and the bottom 100 carbon nanotube structures having a small average length when a manufactured negative electrode is observed through a SEM.

The carbon nanotube structure may be included in the negative electrode active material layer in an amount of 0.01 wt % to 1.0 wt %, specifically 0.01 wt % to 0.5 wt %, more specifically 0.01 wt % to 0.1 wt %. When the above range is satisfied, a conductive path of the negative electrode is secured, so that the lifespan properties of the battery may be improved while maintaining a low level of negative electrode resistance. When preparing a conductive material dispersion, in the case of completely dispersing a bundle-type carbon nanotube (dispersing carbon nanotube units of a single strand to be separated from each other as much as possible by a common dispersion method), the carbon nanotube structure is not generated, or generated in a minimal amount (for example, 0.0005 wt %) if generated by accident. That is, it is impossible to achieve the above content range by a common method. The carbon nanotube structure has a form in which 2 to 5,000 single-walled carbon nanotube units are arranged side by side and coupled to each other, so that the carbon nanotube structure may smoothly maintains its length without being cut despite the volume change of the negative electrode active material. Accordingly, the conductivity of the electrode may be maintained, and due to the high conductivity of the single-walled carbon nanotube units included in the carbon nanotube structure, the conductivity of the negative electrode may be smoothly ensured. Accordingly, even though the content of carbon nanotube structure in the negative electrode is low, the input/output properties and lifespan properties of the battery may be excellent.

Meanwhile, in some cases, the single-walled carbon nanotube units included in the carbon nanotube structure may be surface-treated through oxidation treatment or nitration treatment to improve affinity with a dispersion agent.

When used together with the secondary particles, the carbon nanotube structure has the following effect. The secondary particles are usually disposed on the surface of the negative electrode active material or on the net structure formed by the carbon nanotube structures, and are responsible of a conductive network of a short length. On the other hand, due to the long length thereof, the carbon nanotube structure builds a conductive network of relatively a long length. In addition, as described above, during the charge/discharge of the battery, the carbon nanotube structure may maintain the shape thereof better than a single-walled carbon nanotube unit (in the form of being dispersed into a single strand), so that the conductive network may be more strongly maintained.

The weight ratio of the secondary particle to the carbon nanotube structure may be 100:1 to 100:200, specifically 100:2 to 100:100, more specifically 100:2 to 100:50. When the above range is satisfied, it is possible to reduce the total content of the conductive material to achieve an appropriate level of conductivity while increasing the solid content of the negative electrode slurry. In addition, since the electrical conductivity and adhesive force of the negative electrode may be simultaneously improved, the input/output properties and lifespan properties of the battery may be greatly improved.

The conductive material may further include a multi-walled carbon nanotube unit. When the multi-walled carbon nanotube units are further included, a conductive path may be even more smoothly secured, and since the excessive volume expansion of $SiO_x$ ($0 \leq x < 2$) particles is effectively controlled, the lifespan properties of the battery may be improved. Here, the multi-walled carbon nanotube unit means multi-walled carbon nanotube strands which are completely dispersed and are present in the negative electrode in a single strand.

The specific surface area of the multi-walled carbon nanotube unit may be 150 $m^2$/g to 210 $m^2$/g, specifically 170 $m^2$/g to 190 $m^2$/g. When the above range is satisfied, the multi-walled carbon nanotube units are smoothly dispersed in the negative electrode, and are effective in smoothly securing a conductive path together with the secondary particles.

The average diameter of multi-walled carbon nanotube unit may be 7 nm to 13 nm, specifically 8 nm to 12 nm, more specifically 8.5 nm to 11.5 nm. When the above range is satisfied, a conductive path may be smoothly secured. The average diameter may be derived by observing the manufactured negative electrode with an SEM and obtaining an average value of the diameters of 20 multi-walled carbon nanotube units.

The multi-walled carbon nanotube unit may be included in the negative electrode active material layer in an amount of 0.01 wt % to 1.0 wt %, specifically 0.01 wt % to 0.07 wt %. When the above range is satisfied, a conductive network in the negative electrode may be smoothly formed while the dispersibility and stability of the multi-walled carbon nanotube unit are enhanced, so that the input/output properties and lifespan properties of the battery may be improved.

The negative electrode active material layer may further include carboxy methyl cellulose (CMC). The carboxy methyl cellulose may be a material which starts to be included in the negative electrode from a conductive material dispersion (the secondary particles dispersion, the carbon nanotube structure dispersion) required for preparing a negative electrode slurry, and also, may be additionally introduced to reinforce a binder function when preparing the negative electrode slurry.

The weight average molecular weight of the carboxy methyl cellulose may be 50,000 g/mol to 500,000 g/mol, specifically 50,000 g/mol to 150,000 g/mol, more specifically 90,000 g/mol to 110,000 g/mol. When the above range is satisfied, the carboxy methyl cellulose may be easily penetrated between single-walled carbon nanotube units in a bundle-type carbon nanotube, so that a proper dispersion of the bundle-type carbon nanotube may be achieved and the phase stability of the conductive material dispersion may be improved. Accordingly, the conductivity of the manufactured is greatly improved, battery performance, such as the input/output properties and lifespan properties of the battery, may be improved.

The degree of substitution of the carboxy methyl cellulose may be 0.1 to 3, specifically 0.5 to 2. The degree of substitution means a degree to which a hydroxy group of the carboxy methyl cellulose is substituted with a functional group A. The degree of substitution represents a degree to which a hydroxy group is substituted with a functional group A in the molecular structure of carboxy methyl cellulose, for example, the degree of substitution of a hydroxy group with the functional group A. Specifically, when one of three hydroxy groups present in one repeating unit is substituted with the functional group A, the degree of substitution of the repeating unit is 1. When all three hydroxy groups are substituted with the functional group A, the degree of substitution of the repeating unit is 3. When all three hydroxy groups are not substituted, the degree of substitution of the repeating unit is 0. In the carboxy methyl cellulose, the degree of substitution of hydroxy group by the functional group A represents an average value of the degree of substitution of each repeating unit. In addition, the functional group A may include at least one of —$CH_2CO_2Na$ and —$CH_2CO_2H$.

When the carboxy methyl cellulose has the above degree of substitution, the functional groups A smoothly interact with the single-walled carbon nanotube unit, so that the dispersibility of the carbon nanotube structure may be improved. Accordingly, the negative electrode adhesive force is further improved, and the lifespan properties of the battery may be improved.

The negative electrode active material layer may further include a binder. The binder is to ensure the adhesive force between the negative electrode active materials or between the negative electrode active material and the current collector. Any binder commonly used in the art may be used, and the type thereof is not particularly limited. The binder may be, for example, a vinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, styrene-butadiene rubber (SBR), fluorine rubber, or various copolymers thereof, and the like, and any one thereof or a mixture of two or more thereof may be used.

The binder may be included in an amount of 10 wt % or less based on the total weight of the electrode active material layer, and may preferably be included in an amount of 0.1 wt % to 5 wt %. When the content of binder satisfies the above range, it is possible to implement excellent electrode adhesive force while minimizing the increase in electrode resistance.

<Secondary Battery>

A secondary battery according to another embodiment of the present invention may include the negative electrode of an embodiment described above.

Specifically, the secondary battery may include the negative electrode, a positive electrode, a separator interposed between the positive electrode and the negative electrode, and an electrolyte. The negative electrode is the same as the negative electrode described above. Since the negative electrode has been described above, a detailed description thereof will be omitted.

The positive electrode may include a positive electrode current collector, and a positive electrode active material layer formed on the positive electrode current collector and including the positive electrode active material.

In the positive electrode, the positive electrode current collector is not particularly limited as long as it has conductivity without causing a chemical change in the battery. For example, stainless steel, aluminum, nickel, titanium, fired carbon, or aluminum or stainless steel that is surface-treated with one of carbon, nickel, titanium, silver, and the like may be used. Also, the positive electrode current collector may typically have a thickness of 3 μm to 500 μm, and microscopic irregularities may be formed on the surface of the positive electrode current collector to improve the adhesion of the positive electrode active material. For example, the positive electrode current collector may be used in various forms such as a film, a sheet, a foil, a net, a porous body, a foam, and a non-woven body.

The positive electrode active material may be a positive electrode active material commonly used in the art. Specifically, the positive electrode active material may be a layered compound such as a lithium cobalt oxide ($LiCoO_2$) and a lithium nickel oxide ($LiNiO_2$), or a compound substituted with one or more transition metals; a lithium iron oxide such as $LiFe_3O_4$; a lithium manganese oxide such as $Li_{1+c1}Mn_{2-c1}O_4$ ($0 \leq c1 \leq 0.33$), $LiMnO_3$, $LiMn_2O_3$, and $LiMnO_2$; lithium copper oxide ($Li_2CuO_2$); a vanadium oxide such as $LiV_3O_8$, $V_2O_5$, and $Cu_2V_2O_7$; a Ni-site type lithium nickel oxide represented by the formula $LiNi_{1-c2}M_{c2}O_2$ (wherein M is any one of Co, Mn, Al, Cu, Fe, Mg, B or Ga, and $0.01 \leq c2 \leq 0.3$); a lithium manganese composite oxide represented by the formula $LiMn_{2-c3}M_{c3}O_2$ (wherein, M is any one of Co, Ni, Fe, Cr, Zn, or Ta, and $0.01 \leq c3 \leq 0.1$), or by the formula $Li_2Mn_3MO_8$ (wherein, M is any one of Fe, Co, Ni, Cu, or Zn); $LiMn_2O_4$ having a part of Li in the formula substituted with an alkaline earth metal ion, and the like, but is not limited thereto. The positive electrode may be a Li-metal.

The positive electrode active material layer may include a positive electrode conductive material and a positive electrode binder, together with the positive electrode active material described above.

At this time, the positive electrode conductive material is used to impart conductivity to a positive electrode, and any conductive material may be used without particular limitation as long as it has electron conductivity without causing a chemical change in a battery to be constituted. Specific examples thereof may include graphite such as natural graphite or artificial graphite; a carbon-based material such as carbon black, acetylene black, Ketjen black, channel black, furnace black, lamp black, thermal black, and carbon fiber; metal powder or metal fiber of such as copper, nickel, aluminum, and silver; a conductive whisker such as a zinc oxide whisker and a potassium titanate whisker; a conductive metal oxide such as titanium oxide; or a conductive polymer such as a polyphenylene derivative, and any one thereof or a mixture of two or more thereof may be used.

In addition, the positive electrode binder serves to improve the bonding between positive electrode active material particles and the adhesion between the positive electrode active material and the positive electrode current collector. Specific examples thereof may include polyvinylidene fluoride (PVDF), a polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, styrene-butadiene rubber (SBR), fluorine rubber, or various copolymers thereof, and any one thereof or a mixture of two or more thereof may be used.

The separator is to separate the negative electrode and the positive electrode and to provide a movement path for lithium ions. Any separator may be used without particular limitation as long as it is a separator commonly used in a secondary battery. Particularly, a separator having excellent moisture-retention of an electrolyte as well as low resistance to ion movement in the electrolyte is preferable. Specifically, a porous polymer film, for example, a porous polymer film manufactured using a polyolefin-based polymer such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous non-woven fabric, for example, a non-woven fabric formed of glass fiber having a high melting point, polyethylene terephthalate fiber, or the like may be used. Also, a coated separator including a ceramic component or a polymer material may be used to secure heat resistance or mechanical strength, and may be selectively used in a single-layered or a multi-layered structure.

The electrolyte may be an organic liquid electrolyte, an inorganic liquid electrolyte, a solid polymer electrolyte, a gel-type polymer electrolyte, a solid inorganic electrolyte, a molten-type inorganic electrolyte, and the like, which may be used in the preparation of a lithium secondary battery, but is not limited thereto.

Specifically, the electrolyte may include a non-aqueous organic solvent and a lithium salt.

As the non-aqueous organic solvent, for example, an aprotic organic solvent, such as N-methyl-2-pyrrolidone, propylene carbonate, ethylene carbonate, butylene carbonate, dimethyl carbonate, diethyl carbonate, γ-butyrolactone, 1,2-dimethoxy ethane, tetrahydroxy franc, 2-methyl tetrahydrofuran, dimethyl sulfoxide, 1,3-dioxolane, formamide, dimethylformamide, dioxolane, acetonitrile, nitromethane, methyl formate, methyl acetate, phosphate triester, trimethoxy methane, a dioxolane derivative, sulfolane, methyl sulfolane, 1,3-dimethyl-2-imidazolidinone, a propylene carbonate derivative, a tetrahydrofuran derivative, ether, methyl propionate, and ethyl propionate may be used.

In particular, among the carbonate-based organic solvents, a cyclic carbonate such as ethylene carbonate and propylene carbonate may preferably be used since it is an organic solvent of high viscosity and has high dielectric constant to dissociate a lithium salt well. Such a cyclic carbonate may be more preferably used since when it is mixed with a linear carbonate of low viscosity and low dielectric constant such as dimethyl carbonate and diethyl carbonate in an appropriate ratio, an electrolyte having a high electric conductivity is prepared.

As the metal salt, a lithium salt may be used. The lithium salt is a material which is easily dissolved in the non-aqueous electrolyte solution. For example, as an anion of the lithium salt, one or more selected from the group consisting of $F^-$, $Cl^-$, $I^-$, $NO_3^-$, $N(ON)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SP_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$ may be used.

In the electrolyte, in order to improve the lifespan properties of a battery, to suppress the decrease in battery capacity, and to improve the discharge capacity of the battery, one or more additives, for example, a halo-alkylene carbonate-based compound such as difluoroethylene carbonate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, and the like may be further included other than the above electrolyte components.

According to yet another embodiment of the present invention, a battery module including the secondary battery as a unit cell, and a battery pack including the same are provided. The battery module and the battery pack include the secondary battery which has high capacity, high rate properties, and cycle properties, and thus, may be used as a power source of a medium-and-large sized device selected from the group consisting of an electric car, a hybrid electric vehicle, a plug-in hybrid electric vehicle, and a power storage system.

<Method for Manufacturing Negative Electrode>

A method for manufacturing a negative electrode according to another embodiment of the present invention includes preparing a conductive material, preparing a negative electrode slurry including a negative electrode active material and the conductive material, and preparing a negative electrode active material layer by drying the negative electrode slurry, wherein the negative electrode active material layer includes a negative electrode active material and a conductive material. The negative electrode active material includes $SiO_x$ (0≤x<2) particles and the conductive material includes secondary particles in which a portion of one graphene sheet is connected to a portion of an adjacent graphene sheet and a carbon nanotube structure in which 2 to 5,000 single-walled carbon nanotube units are coupled to each other, wherein the oxygen content of the secondary particles is 1 wt % to 10 wt % based on the total weight of the secondary particles, the specific surface area of the secondary particles measured by a nitrogen adsorption BET method is 500 $m^2/g$ to 1100 $m^2/g$, and the carbon nanotube structure is included in the negative electrode active material layer in an amount of an 0.01 wt % to 1.0 wt %. Specifically, the negative electrode active material, the conductive material, and the negative electrode active material layer are the same as the negative electrode active material, the conductive material, and the negative electrode active material layer described in the above-described embodiment, and thus, descriptions thereof will be omitted.

The step of preparing a conductive material may include preparing the secondary particles and preparing the carbon nanotube structure.

1) Preparing Secondary Particles

The preparing of secondary particles includes preparing conductive particles, and transforming the conductive particles by oxidation treatment. The transforming of the conductive particles by oxidation treatment may include at least one of a) performing heat treatment on the conductive particles in an oxygen atmosphere or an air atmosphere at a heat treatment temperature of 200° C. to 800° C., and b) reacting the conductive particles with acidic vapor of 120° C. to 300° C.

In the preparing of conductive particles, the conductive particles may be carbon black. Specifically, the conductive particles may be at least one selected from the group consisting of acetylene black, furnace black, thermal black, channel black, and lamp black. More specifically, the conductive particles may be acetylene black which is prepared at the highest temperature of all of the above, thereby basically having an excellent degree of graphitization.

The preparing of conductive particles may include pyrolyzing acetylene gas, and through the pyrolysis, carbon black, specifically acetylene black may be formed. The acetylene gas may be acetylene gas of high purity, and may be acetylene having, specifically a purity of 95% or greater, more specifically a purity of 98% or greater.

The pyrolysis may be pyrolyzing the acetylene gas at a temperature of 1500° C. or higher, specifically 1500° C. to 2200° C., more specifically 1500° C. to 2000° C. When the above range is satisfied, the degree of graphitization of the prepared conductive particles may be high, and accordingly, the degree of graphitization of secondary particles to be prepared may be also high. Therefore, the electrical conductivity of the secondary particles may be improved.

The conductive particles may be carbon black, but may preferably be acetylene black for the following reasons among other reasons. A graphene sheet included by the secondary particles may be formed by deforming the surface of the conductive particles by oxidation treatment. The surface of the acetylene black formed by the pyrolysis has a high degree of graphitization. Therefore, compared to performing oxidation treatment on another carbon black essentially including some oxygen functional groups on the surface thereof, when performing oxidation treatment on the acetylene black, the structure of a graphene sheet may be smoothly formed.

The pyrolysis may be performed by adjusting the temperature inside a reaction furnace to be in the above temperature range, introducing acetylene gas into the reaction furnace, and performing pyrolysis instantaneously. Also, in the above process, oxygen, $H_2O$, and the like may be additionally introduced to control the density of secondary particles, oxygen functional groups, and the like, and it is possible to control the connection structure of graphene sheets in the secondary particles.

The transforming the conductive particles by oxidation treatment may include at least one of a) performing a primary heat treatment on the conductive particles in an oxygen atmosphere or an air atmosphere at a heat treatment temperature of 200° C. to 800° C. (Step a), and b) reacting the conductive particles with acidic vapor of 120° C. to 300° C. (Step b).

In Step a, the oxygen atmosphere or the air atmosphere may be formed by introducing oxygen or air into the reaction furnace in which the conductive particles are accommodated. Specifically, a graphene sheet structure may be formed by an oxidation process in the reaction furnace according to the setting of an appropriate inflow amount and rate of oxygen or air, an appropriate reaction temperature, and an appropriate reaction duration when performing the primary heat treatment. In addition, the conditions of the oxidation process may vary due to the difference in density of the conductive particles, content of oxygen functional groups, and the like.

In Step a, the primary heat treatment may be performed by controlling the temperature of the reaction furnace in which the conductive particles are accommodated. The primary heat treatment may be performed at a heat treatment temperature of 200° C. to 800° C., and specifically, may be performing heat treatment at a heat treatment temperature of 200° C. to 450° C. When the temperature range is satisfied, conductive particles may be prevented from being oxidized excessively and rapidly, and a graphene sheet of a desired size may be formed. The primary heat treatment may be performed for 1 hour to 50 hours.

In Step b, the conductive particles may react with acidic vapor and be oxidized to form graphene. Specifically, the acidic vapor may be vapor derived from an acidic solution such as HCl, $HNO_3$, and the like. The temperature of the acidic vapor reacting with the conductive particles may be 120° C. to 300° C.

After the step of transforming the conductive particles by oxidation treatment, a process of performing a secondary heat treatment may be additionally performed in an inert atmosphere to increase the size of the formed graphene sheet. Specifically, the method for preparing the conductive material may further include, after the step of transforming the conductive particles by oxidation treatment, a step of performing a secondary heat treatment on the conductive particles transformed by the oxidation treatment at a temperature of 500° C. or higher in an inert atmosphere. At this time, the inert atmosphere may be formed of one gas selected from the group consisting of vacuum, helium, argon, and nitrogen. The secondary heat treatment temperature may be 500° C. or higher, specifically 500° C. to 2800° C., more specifically 600° C. to 1600° C.

The mechanism by which the secondary particles are formed by the method for manufacturing the secondary particles may be as follows. First, the average size of spherical primary particles is 50 nm or less, and oxidation treatment is performed under specific conditions on spherical or chain-type carbon black, specifically acetylene black, in which the primary particles share tissues. In this case, an oxidation agent such as oxygen and acid vapor penetrates and is oxidized starting from a portion having a defect such as grain boundary or dislocation which is present in a micro unit structure of the carbon black. When the oxidation treatment is performed for a predetermined period of time in the temperature range mentioned above in the manufacturing method, the oxidation agent penetrates to the micro structure inside the carbon black to perform oxidation. At this time, in order to relieve the structural stress of the micro structure inside the primary particles having a radius of curvature greater than the radius of curvature of the surface of the spherical primary particles, an oxidation reaction proceeds quickly inside. Accordingly, carbons inside are oxidized into a gas such as CO, $CO_2$, and $CH_4$, and the primary particles are changed into a hollow type. As the surface structure of the hollow-type primary particles is also destroyed by the continuous oxidation treatment, structural stress remaining in the spherical primary particles may be mostly relieved, and during the process, graphene sheets appear. Therefore, the smaller the average size of carbon black which is the primary particles, the smaller the internal density of the particles, and the higher the oxygen functional group content inside the primary particles rather than on the surface thereof, the more the deformation process is accelerated. Also, in terms of further accelerating the deformation process, Step a is more preferably than Step b.

2) Preparing Carbon Nanotube Structure

The preparing of the carbon nanotube structure may include a step (S1-1) of preparing a mixed solution including a dispersion medium, a dispersion agent, and a bundle-type single-walled carbon nanotube (a combination or agglomerate of single-walled carbon nanotube units); and a step of (S1-2) applying a shearing force to the mixed solution to disperse the bundle-type single-walled carbon nanotube to form a carbon nanotube structure in which 2 to 5,000 single-walled carbon nanotube units are coupled side by side.

In Step S1-1, the mixed solution may be prepared by introducing bundle-type single-walled carbon nanotube and a dispersion agent into a dispersion medium. The bundle-type single-walled carbon nanotube is in which the above-described single-walled carbon nanotube units are coupled in a bundle form, and usually includes two or more, substantially 500 or more, for example 5,000 or more of single-walled carbon nanotube units.

The specific surface area of the bundle-type single-walled carbon nanotube may be 500 $m^2/g$ to 1,000 $m^2/g$, specifically 600 $m^2/g$ to 800 $m^2/g$. When the above range is satisfied, a conductive path may be smoothly secured in the negative electrode active material layer due to a large specific surface area, so that there is an effect of maximizing the conductivity in the negative electrode even with a minimal amount of a conductive material.

The bundle-type single-walled carbon nanotube may be included in the mixed solution in an amount of 0.1 wt % to 1.0 wt %, specifically 0.2 wt % to 0.5 wt %. When the above range is satisfied, the bundled single-walled carbon nanotube is dispersed to a suitable level, so that a carbon nanotube structure of an appropriate level may be formed, and dispersion stability may be improved.

Water ($H_2O$) may be used as the dispersion medium.

The dispersion agent may be at least one of carboxy methyl cellulose (CMC) and polyvinylpyrrolidone (PVP), and may preferably be carboxy methyl cellulose. The carboxy methyl cellulose is the same as the carboxy methyl cellulose of the other embodiment described above, and thus, the description thereof will be omitted.

The weight ratio of the bundle-type carbon nanotube and the dispersion agent in the mixed solution may be 1:0.1 to 1:2.5, specifically 1:0.5 to 1:2. When the above range is satisfied is satisfied, the bundled single-walled carbon nanotube is dispersed to a suitable level, so that a carbon nanotube structure of an appropriate level may be formed, and dispersion stability may be improved.

The solid content in the mixed solution may be 0.1 wt % to 20 wt %, specifically 1 wt % to 10 wt %. When the above range is satisfied, the bundled single-walled carbon nanotube is dispersed to a suitable level, so that a carbon nanotube structure of an appropriate level may be formed, and dispersion stability may be improved. In addition, a negative electrode slurry may have a viscosity and elasticity suitable for a process of manufacturing a negative electrode, and the solid content of the negative electrode slurry may also be increased.

In Step S1-2, a process of dispersing the bundle-type carbon nanotube in the mixed solution may be performed using a mixing device such as a homogenizer, a beads mill, a ball mill, a basket mill, an attrition mill, an all-purpose stirrer, a clear mixer, a spike mill, a TK mixer, or sonification equipment. Among the above, a beads mill method is preferable in that the diameter size of a carbon nanotube structure may be precisely controlled, a uniform distribution of the carbon nanotube structure may be achieved, and there is an advantage in terms of cost.

The beads mill method may be as follows. The mixed solution may be placed in a container containing beads, and the container may be rotated to disperse the bundled single-walled carbon nanotube.

At this time, the conditions under which the beads mill method is performed are as follows.

The average particle diameter of the beads may be 0.5 mm to 1.5 mm, specifically 0.5 mm to 1.0 mm. When the above range is satisfied, the diameter size may be appropriately controlled without breaking a carbon nanotube structure during the dispersion process, and a dispersion solution having a uniform composition may be prepared.

The rotational speed of the container may be 500 RPM to 10,000 RPM, specifically 2,000 RPM to 6,000 RPM. When the above range is satisfied, the diameter size may be appropriately controlled without breaking a carbon nanotube structure during the dispersion process, and a dispersion solution having a uniform composition may be prepared.

The period of time during which the beads-milling is performed may be 0.5 hours to 2 hours, specifically 0.5 hours to 1.5 hours, more specifically 0.8 hours to 1 hour. When the above range is satisfied, the diameter size may be appropriately controlled without breaking a carbon nanotube structure during the dispersion process, and a dispersion solution having a uniform composition may be prepared. The beads-milling performance time means the total period of time during which beads-milling is applied. For example, if beads-milling has been performed for several times, the beads-milling performance time means the total period of time during which the several times of bead-milling were performed.

The beads-milling conditions are for dispersing a bead-mill single-walled carbon nanotube to a suitable level except for, specifically, a case in which the bundle-type single-walled carbon nanotube is dispersed into single-walled carbon nanotubes in a single strand. That is, the beads-milling conditions are for dispersing the bundle-type single-walled carbon nanotube to a suitable level to form a single-walled carbon nanotube structure in which 2 to 5,000 single-walled carbon nanotube units are coupled to each other side by side in a prepared conductive material dispersion. The above may be achieved only when the composition of the mixed solution, the dispersion process (for example, a beads mill process) conditions, and the like are strictly controlled.

Through the above process, a carbon nanotube structure present in the dispersion may be formed.

In the step of preparing a negative electrode slurry including the negative electrode active material and the conductive material, the negative electrode active material and the conductive material may be introduced into a solvent and then stirred. In addition, the above-described binder may be introduced to a solvent. The solvent corresponds to a solvent commonly used in the art.

The step of preparing a negative electrode active material layer by drying the negative electrode slurry may include preparing a negative electrode by applying the negative electrode slurry on the current collector, followed by drying. Alternatively, a method in which the negative electrode slurry is applied on a support and dried, and then the support is removed may be included.

Hereinafter, Examples of the present invention will be described in detail so that those skilled in the art may easily carry out the present invention. However, the present invention may be embodied in many different forms, and is not limited to Examples set forth herein.

Preparation Example 1: Preparing Secondary Particle Dispersion (1) Forming Conductive Particles (Acetylene Black)

Acetylene gas having a purity of 98% was instantaneously sprayed into a reaction furnace having an internal temperature of 2000° C. and pyrolyzed to form acetylene black.

(2) Preparing Secondary Particles

Figure 2:
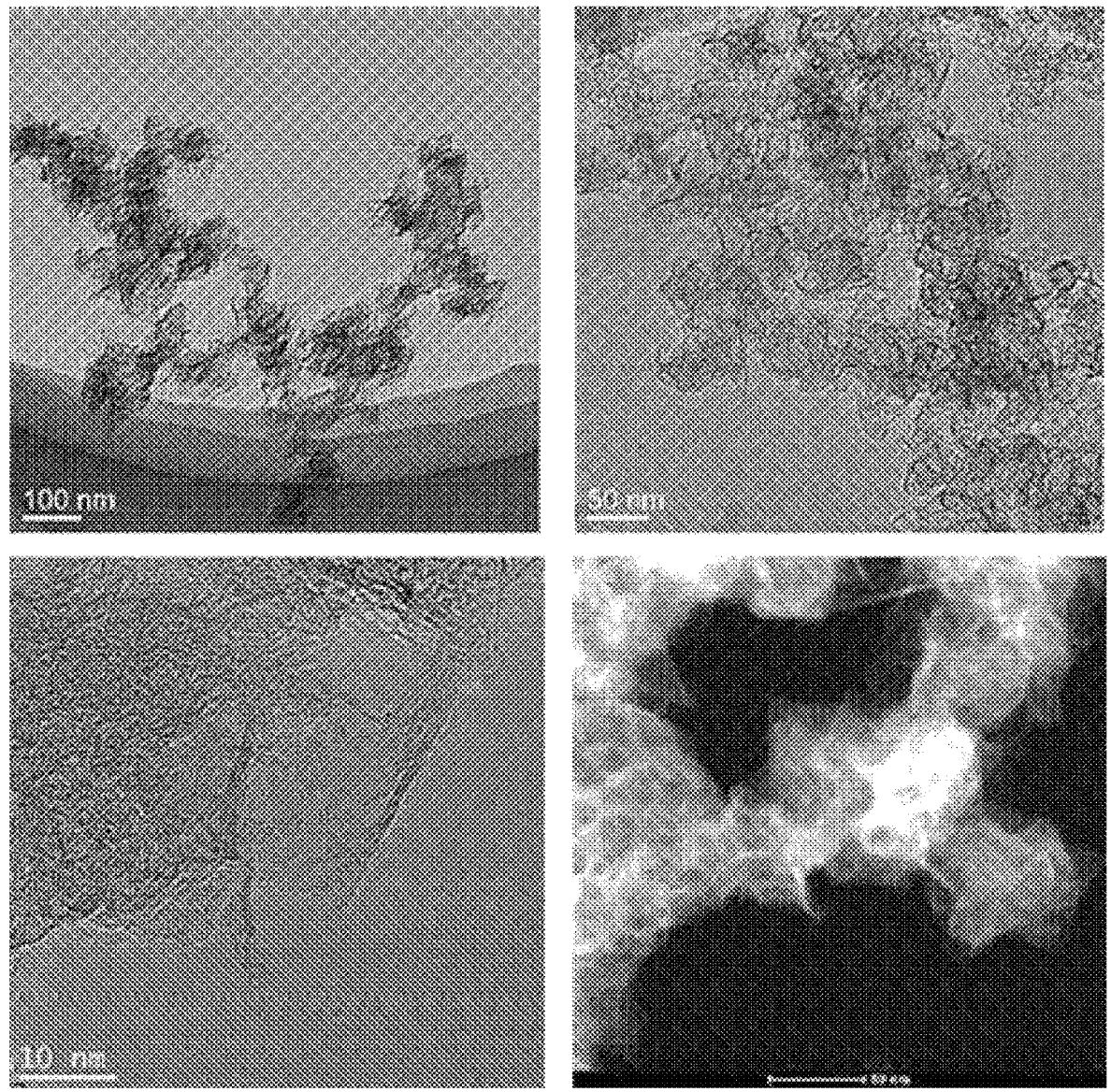
FIG. 2 is a TEM and STEM (scanning TEM) photographs of Preparation Example 1.
Figure 3:
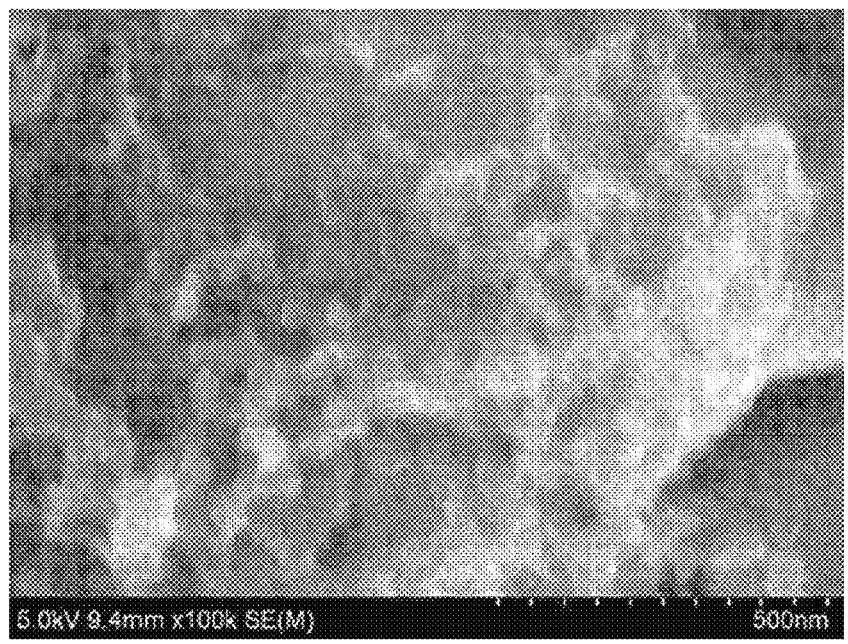
FIG. 3 is an SEM photograph of secondary particles of Preparation Example 1.

Next, the internal temperature of the reaction furnace containing the acetylene black was set to 250° C., and then oxidation treatment was performed for 30 hours while introducing oxygen. Through the above, secondary particles were obtained, the secondary particles including a form in which a plurality of graphene sheets having a lateral size of about 41 nm (including a plurality of graphene sheets having different orientations) are connected to other adjacent graphene sheets (See FIGS. 2 and 3).

(3) Preparing Dispersion 0.4 parts by weight of the secondary particles and 0.6 parts by weight of carboxy methyl cellulose (CMC) (weight average molecular weight: 100,000 g/mol, degree of substitution: 1.0) were mixed with 99.0 parts by weight of water (H2O), which is a solvent, to form a mixture (solids 1.0 wt %). The mixture was stirred in a beads mill manner. At this time, the particle diameter of a bead was 1 mm, and the rotational speed of the stirring vessel containing the bead was 3,000 RPM. The stirring was performed for 60 minutes.

Preparation Example 2: Preparing Secondary Particle Dispersion

Figure 4:
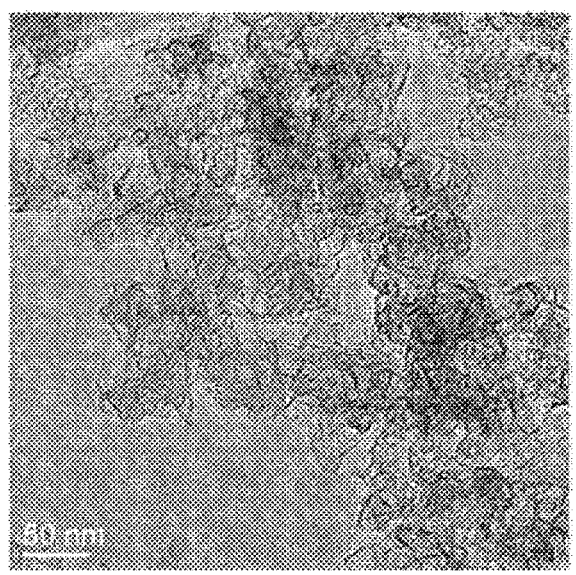
FIG. 4(a) is a TEM image of secondary particles according to Preparation Example 1 and FIG. 4(b) is a TEM image of secondary particles according to Preparation Example 2.
Figure 4:
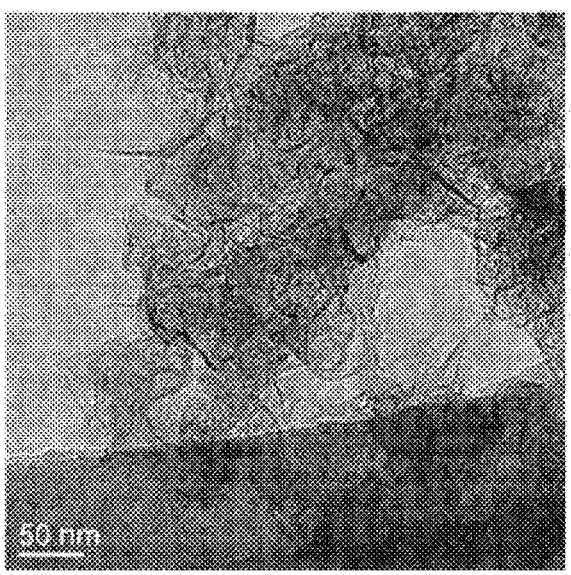

On the conductive material obtained in Preparation Example 1, additional heat treatment was performed in an inert atmosphere at 900° C. for 1 hour to obtain secondary particles including a form in which a plurality of graphene sheets having a lateral size of about 65 nm are connected to other adjacent graphene sheets. Referring to FIG. 4, it can be seen that the conductive material of Preparation Example 1 shown in FIG. 4(a) was changed into the conductive material of FIG. 4(b) by heat treatment. Specifically, it can be seen that adjacent graphene sheets were connected to each other by the heat treatment, thereby increasing the lateral size.

Thereafter, a secondary particle dispersion was prepared under the same stirring conditions as in Preparation Example 1.

Preparation Example 3: Preparing Carbon Nanotube Structure 0.4 parts by weight of a bundle-type single-walled carbon nanotube (specific surface area of 650 $m^2/g$) composed of single-walled carbon nanotube units having an average diameter of 1.5 nm and an average length of 5 μm or more and 0.6 parts by weight of carboxy methyl cellulose (CMC) (weight average molecular weight: 100,000 g/mol, degree of substitution: 1.0) were mixed with 99.0 parts by weight of water ($H_2O$), which is a solvent, to prepare a mixture having solids of 1.0 wt %.

The mixture was stirred in a beads mill manner to disperse the bundle-type single-walled carbon nanotube in the solvent to prepare a carbon nanotube structure dispersion. At this time, the particle diameter of a bead was 1 mm, and the rotational speed of the stirring vessel containing the bead was 3,000 RPM. The stirring was performed for 60 minutes. The carbon nanotube structure dispersion included a carbon nanotube structure in which 2 to 5,000 single-walled carbon nanotube units were coupled side by side (see FIG. 5(A)).

The carbon nanotube structure was 0.4 wt % and the carboxy methyl cellulose was 0.6 wt % in the carbon nanotube structure dispersion.

Preparation Example 4: Preparing Carbon Nanotube Structure

A carbon nanotube structure dispersion was prepared in the same manner as in Preparation Example 3, except that the carboxy methyl cellulose used in Preparation Example 3 was replaced with carboxy methyl cellulose having a weight average molecular weight of 400 g/mol and a degree of substitution of 1.0.

Preparation Example 5: Preparing Single-Walled Carbon Nanotube Unit

A carbon nanotube structure dispersion was prepared in the same manner as in Preparation Example 3, except that carboxy methyl cellulose was 1.2 parts by weight in Preparation Example 3 and stirring through a beads mill was performed for a total of 4 cycles (performing natural cooling for 60 minutes between cycles) with 1 cycle being performed for 60 minutes. In the dispersion, the bundle-type carbon nanotube was completely dispersed so that only single-walled carbon nanotube units were present in a single-strand unit and the carbon nanotube structure was not detected.

Preparation Example 6: Preparing Multi-Walled Carbon Nanotube Unit Dispersion 0.4 parts by weight of a bundle-type multi-walled carbon nanotube (the specific surface area thereof is 184 $m^2/g$ and the average diameter of multi-walled carbon nanotube units included therein is 10 nm) and 0.6 parts by weight of carboxy methyl cellulose (CMC) (weight average molecular weight: 100,000 g/mol, degree of substitution: 1.0) were mixed with 99.0 parts by weight of water ($H_2O$), which is a solvent, to prepare a mixture. The mixture was stirred in a beads mill manner. At this time, the particle diameter of a bead was 1 mm, and the rotational speed of the stirring vessel containing the bead was 3,000 RPM. The stirring was performed for 60 minutes.

Figure 6:
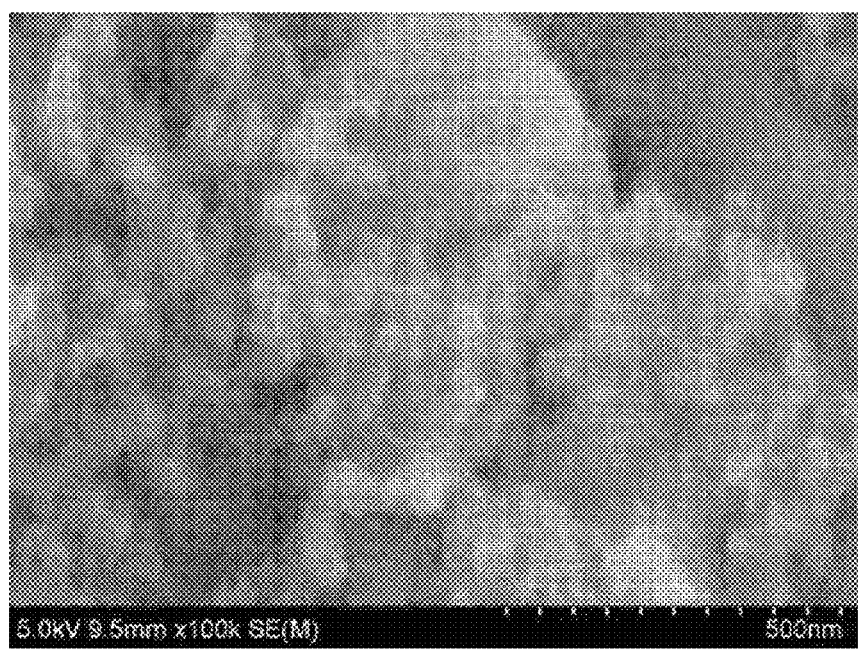
FIG. 6 is an SEM photograph of carbon black of Preparation Example 7.

Preparation Example 7: Preparing Carbon Black Dispersion 0.4 parts by weight of carbon black (in a secondary particle form with a specific surface area of 135 $m^2/g$ and a primary particle diameter of 23 nm) and 0.6 parts by weight of carboxy methyl cellulose (CMC) (weight average molecular weight: 100,000 g/mol, degree of substitution: 1.0) were mixed with 99.0 parts by weight of water ($H_2O$), which is a solvent, to prepare a mixture. The mixture was stirred in a beads mill manner. At this time, the particle diameter of a bead was 1 mm, and the rotational speed of the stirring vessel containing the bead was 3,000 RPM. The stirring was performed for 60 minutes (see FIG. 6).

Example 1: Manufacturing Negative Electrode

A negative electrode slurry including negative electrode active material particles (SiO having an average particle diameter ($D_{50}$) of 6.6 μm, artificial graphite having an average particle diameter ($D_{50}$) of 21 μm), styrene butadiene rubber (SBR) and carboxy methyl cellulose (CMC) as binders, the secondary particle dispersion of Preparation Example 1, and the carbon nanotube structure dispersion of Preparation Example 3 was prepared (solvent: $H_2O$). The weight ratio of the negative electrode active material particles, the binder, the secondary particles, and the carbon nanotube structure was 95.5:3.5:0.95:0.05. The weight ratio of the SiO to the artificial graphite was 5:95, and the weight ratio of SBR to CMC of the binder was 2:1.5.

The above negative electrode slurry was applied with a loading of 160 mg/25 $cm^2$ on a copper (Cu) metal thin film having a thickness of 20 μm, which is a negative electrode current collector, and then dried. At this time, the temperature of circulated air was 70° C. Thereafter, the negative electrode current collector on which the slurry was applied and dried was roll-pressed and then dried in a vacuum oven of 130° C. for 8 hours to manufacture a negative electrode.

Figure 7:
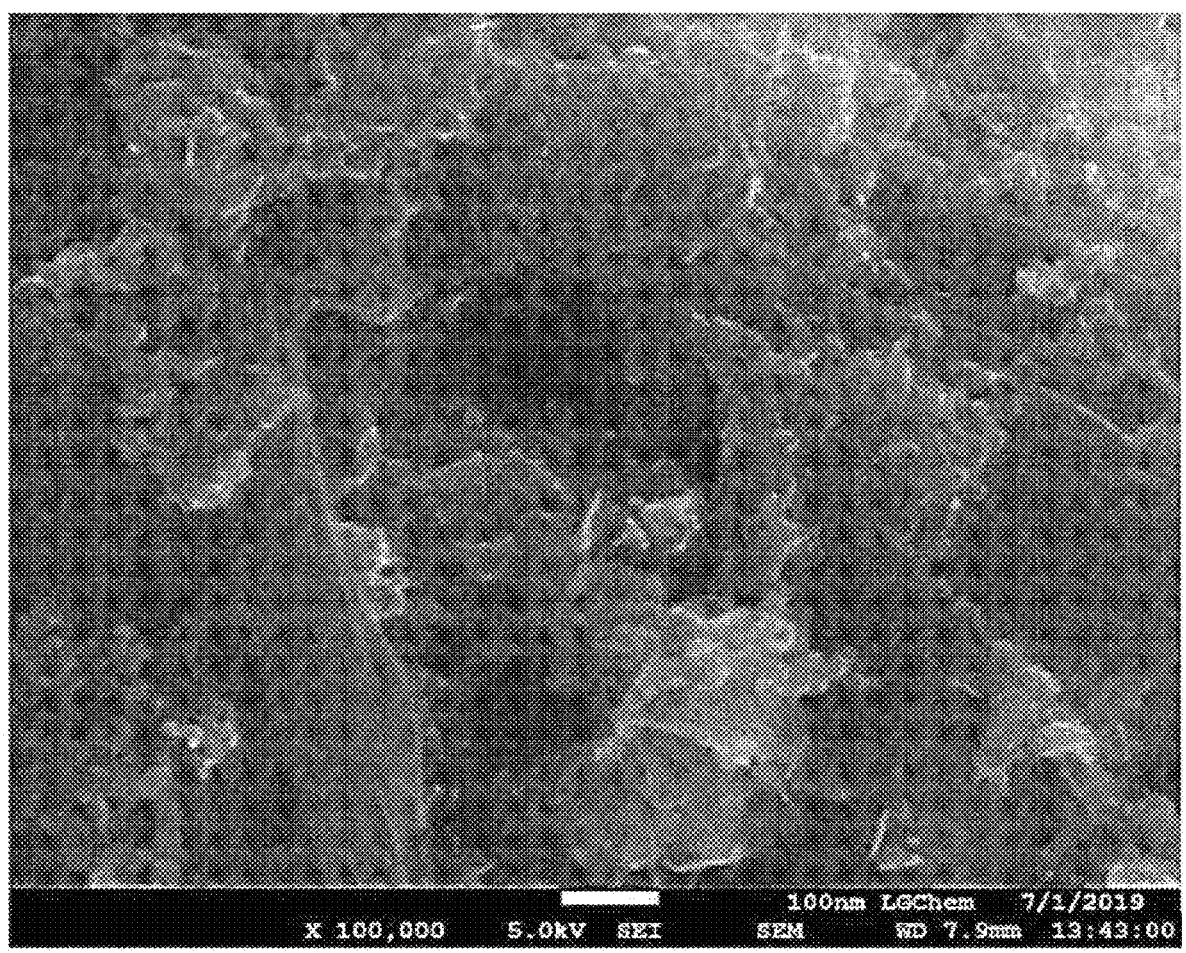
FIG. 7 is an SEM photograph of a negative electrode of Example 1.

Referring to FIG. 7, in the negative electrode of Example 1, it can be seen that the carbon nanotube structures (a structure in which 2 to 5,000 single-walled carbon nanotube units are arranged side by side and coupled to each other) were connected to each other to form a net structure. In addition, it can be seen that the secondary particles were disposed on the carbon nanotube structure, so that a strong conductive network was formed due to the carbon nanotube structure and the secondary particles.

Example 2: Manufacturing Negative Electrode

A negative electrode was manufactured in the same manner as in Example 1 except that the secondary particle dispersion of Preparation Example 2 was used instead of the secondary particle dispersion of Preparation Example 1.

Example 3: Manufacturing Negative Electrode

A negative electrode was manufactured in the same manner as in Example 1 except that the carbon nanotube structure of Preparation Example 4 was used instead of the carbon nanotube structure of Preparation Example 3. The weight ratio of the negative electrode active material particles, the binder, the secondary particles, and the carbon nanotube structure was 95.54:3.46:0.95:0.05. The weight ratio of the SiO to the artificial graphite was 5:95, and the weight ratio of SBR to CMC of the binder was 2:1.46.

Example 4: Manufacturing Negative Electrode

A negative electrode was manufactured in the same manner as in Example 1 except that the secondary particle dispersion of Preparation Example 2 was used instead of the secondary particle dispersion of Preparation Example 1 and the carbon nanotube structure dispersion of Preparation Example 4 was used instead of the carbon nanotube structure dispersion of Preparation Example 3.

Example 5: Manufacturing Negative Electrode

A negative electrode was manufactured in the same manner as in Example 1 except that the multi-walled carbon nanotube unit dispersion of Preparation Example 6 was used together with the secondary particle dispersion of Preparation Example 1 and the carbon nanotube structure dispersion of Preparation Example 3. The weight ratio of the negative electrode active material particles, the binder, the secondary particles, the carbon nanotube structure, and the multi-walled carbon nanotube unit was 95.5:3.5:0.9:0.05:0.05.

Comparative Example 1: Manufacturing of Negative Electrode

A negative electrode was manufactured in the same manner as in Example 1 except that only the secondary particle dispersion of Preparation Example 1 was used without using the carbon nanotube structure dispersion of Preparation Example 3. The weight ratio of the negative electrode active material particles, the binder, and the secondary particles was 95.5:3.5:1.0. The weight ratio of the SiO to the artificial graphite was 5:95, and the weight ratio of SBR to CMC was 2:1.5.

Comparative Example 2: Manufacturing of Negative Electrode

A negative electrode was manufactured in the same manner as in Comparative Example 1 except that the secondary particle dispersion of Preparation Example 2 was used instead of the secondary particle dispersion of Preparation Example 1.

Comparative Example 3: Manufacturing of Negative Electrode

A negative electrode was manufactured in the same manner as in Example 1 except that the multi-walled carbon nanotube unit dispersion of Preparation Example 6 was used instead of the carbon nanotube structure dispersion of Preparation Example 3. The weight ratio of the negative electrode active material particles, the binder, the secondary particles, and the multi-walled carbon nanotube unit was 95.5:3.5: 0.95:0.05. The weight ratio of the SiO to the artificial graphite was 5:95, and the weight ratio of SBR to CMC of the binder was 2:1.5.

Comparative Example 4: Manufacturing of Negative Electrode

A negative electrode was manufactured in the same manner as in Example 1 except that only the carbon nanotube structure of Preparation Example 3 was used without using the secondary particles of Preparation Example 1.

Comparative Example 5: Manufacturing of Negative Electrode

A negative electrode was manufactured in the same manner as in Example 1 except that the carbon black dispersion of Preparation Example 7 was used instead of the secondary particles of Preparation Example 1. The weight ratio of the negative electrode active material particles, the binder, the carbon black, and the carbon nanotube structure was 95.5:3.5:0.95:0.05. The weight ratio of the SiO to the artificial graphite was 5:95, and the weight ratio of SBR to CMC of the binder was 2:1.5.

Comparative Example 6: Manufacturing of Negative Electrode

Figure 8:
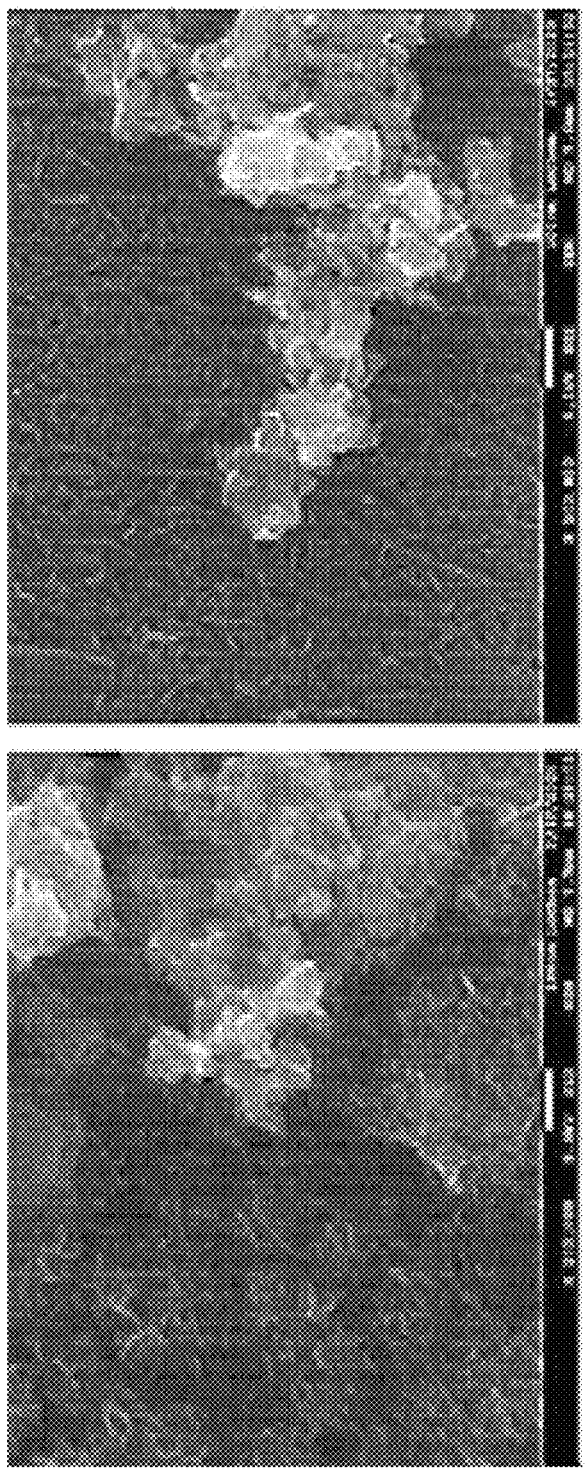
FIG. 8 is SEM photographs of a negative electrode of Comparative Example 6.

A negative electrode was manufactured in the same manner as in Example 1 except that the single-walled carbon nanotube unit dispersion of Preparation Example 5 was used instead of the carbon nanotube structure of Preparation Example 3. The weight ratio of the negative electrode active material particles, the binder, the secondary particles, and the multi-walled carbon nanotube unit was 95.42:3.58:0.95: 0.05. The weight ratio of the SiO to the artificial graphite was 5:95, and the weight ratio of SBR to CMC of the binder was 2:1.58. Referring to FIG. 8, a carbon nanotube structure which was shown in Example 1 was not shown in the negative electrode of Comparative Example 6, and a single-walled comparative tube which was short and present by being dispersed by one strand was identified.

TABLE 1

| | Secondary particle content (wt %) | Carbon nanotube structure content (wt %) | Single-walled carbon nanotube unit (completely dispersed) content (wt %) | Carbon black content (wt %) | Multi-walled carbon nanotube unit content (wt %) |
|---|---|---|---|---|---|
| Example 1 | 0.95 | 0.05 | — | — | — |
| Example 2 | 0.95 | 0.05 | — | — | — |
| Example 3 | 0.95 | 0.05 | — | — | — |
| Example 4 | 0.95 | 0.05 | — | — | — |
| Example 5 | 0.9 | 0.05 | — | — | 0.05 |
| Comparative Example 1 | 1.0 | — | — | — | — |
| Comparative Example 2 | 1.0 | — | — | — | — |
| Comparative Example 3 | 0.95 | — | — | — | 0.05 |
| Comparative Example 4 | — | 1.0 | — | — | — |
| Comparative Example 5 | — | 0.05 | — | 0.95 | — |
| Comparative Example 6 | 0.95 | — | 0.05 | — | — |

In Table 2 and Table 3, the physical properties of a conductive material used in each of Examples and Comparative Examples are shown.

TABLE 2

| | Lateral size of graphene sheet or average size of carbon black primary particles (nm) | Nitrogen adsorption specific surface area ($m^2/g$) | Iodine adsorption value (mg/g) | Oxygen content (wt %) | Raman spectrum D/G ratio |
|---|---|---|---|---|---|
| Secondary particles of Preparation Example 1 | 41 (graphene sheet) | 825 | 849 | 8.9 | 1.42 |
| Secondary particles of Preparation Example 2 | 65 (graphene sheet) | 712 | 736 | 3.2 | 1.27 |
| Carbon black of Preparation Example 7 | 23 (carbon black primary particles) | 135 | 152 | 0.3 | 1.23 |
| Multi-walled carbon nanotube unit of Preparation Example 6 | — | 184 | — | 0.2 | 0.91 |

1) Lateral size (nm) of graphene sheet: Evaluated by measuring the size of 100 graphene sheets in secondary particles by a TEM (JEOL, JEM-2010F), followed by calculating the average thereof.

2) Nitrogen adsorption specific surface area ($m^2/g$): Measured by performing degassing for 8 hours at 200° C. using a BET measurement device (BEL-SORP-MAX, Nippon Bell) and then performing $N_2$ adsorption/desorption at 77 K.

3) Iodine adsorption value (mg/g): Measured according to an ASTM D1510 method.

4) Oxygen content (wt %): The content of C, H, N elements was measured through an element analysis device (CHN-coder MT-5, Yanako) and then the oxygen differential was calculated by reflecting the amount of residual ash.

5) Raman spectrum D/G ratio: Measured by analyzing the Raman spectrum with an Ar-ion laser having a wavelength of 514.5 nm through a Raman spectroscopy analysis device (NRS-2000B, Jasco).

TABLE 3

|  | Average diameter (nm) | Average length (μm) |
|---|---|---|
| Carbon nanotube structure of Preparation Example 3 | 10.5 | 8.2 |
| Carbon nanotube structure of Preparation Example 4 | 101.2 | 15.6 |
| Single-walled carbon nanotube unit of Preparation Example 5 | 1.6 | 1.8 |
| Multi-walled carbon nanotube unit of Preparation Example 6 | 10.8 | 1.3 |

The average diameter and average length correspond to average values of the diameters and lengths of the top 100 carbon nanotube structures (or single-walled carbon nanotube units, or multi-walled carbon nanotube units) having a large diameter (or length) and the bottom 100 carbon nanotube structures (or single-walled carbon nanotube units, or multi-walled carbon nanotube units) having a small diameter (or length) when the manufactured negative electrode was observed through a TEM.

Experimental Example 1: Evaluation of High-Temperature Lifespan Properties (Capacity Retention Rate)

Using the negative electrode of each of Examples 1 to 5 and Comparative Examples 1 to 6, a battery was manufactured in the following manner.

As the positive electrode active material, $Li[Ni_{0.6}Mn_{0.2}Co_{0.2}]O_2$ was used. The positive electrode active material, carbon black which is a conductive material, polyvinylidene fluoride (PVDF) which is a binder were mixed at a weight ratio of 94:4:2 to N-methyl-2-pyrrolidone (NMP) which is a solvent to prepare a positive electrode slurry.

The prepared positive electrode slurry was applied on an aluminum metal thin film having a thickness of 15 μm, which is a positive electrode current collector, and then dried. At this time, the temperature of circulated air was 110° C. Thereafter, the aluminum metal thin film applied with the positive electrode slurry and then dried was roll-pressed, and then dried in a vacuum oven at 130° C. for 2 hours to prepare a positive electrode active material layer.

The negative electrode of each of Examples 1 to 5 and Comparative Examples 1 and 6, the positive electrode manufacture above, and a porous polyethylene separator were assembled using a stacking method, and the assembled battery was injected with an electrolyte (ethylene carbonate (EC)/ethyl methyl carbonate (EMC)=1/2 (volume ratio), lithium hexa fluoro phosphate ($LiPF_6$ 1 mole) to manufacture a lithium secondary battery.

Each of the lithium secondary batteries were subjected to charge discharge under the following conditions.

Charge condition: charged to 4.25 V with 0.5 C constant current, and then charged to 4.2 V until 0.1 C current rate Discharge condition: discharged to 2.8 V with 0.5 C current rate The above charge and discharge were set as one cycle, and 100 cycles were performed at 45° C. Thereafter, the discharge capacity after 100 cycles (capacity retention rate) based on 100% of the discharge capacity after one cycle was evaluated and shown in Table 4.

TABLE 4

|  | Capacity retention rate (%) |
|---|---|
| Example 1 | 94.8 |
| Example 2 | 95.2 |
| Example 3 | 93.5 |
| Example 4 | 94.3 |
| Example 5 | 95.7 |
| Comparative Example 1 | 88.3 |
| Comparative Example 2 | 89.6 |
| Comparative Example 3 | 91.4 |
| Comparative Example 4 | 93.1 |
| Comparative Example 5 | 87.2 |
| Comparative Example 6 | 88.5 |

The invention claimed is:

1. A negative electrode comprising a negative electrode active material layer,
   wherein the negative electrode active material layer includes a negative electrode active material and a conductive material,
   wherein the negative electrode active material includes $SiO_x$ (0≤x<2) particles, and
   the conductive material includes:
   secondary particles comprise a plurality of graphene sheets arranged in different directions, wherein a portion of a graphene sheet is connected to a portion of an adjacent graphene sheet; and
   a carbon nanotube structure in which 2 to 5,000 single-walled carbon nanotube units are bonded side by side in a single plane and,
   wherein an oxygen content of the secondary particles is 1 wt % to 10 wt % based on a total weight of the secondary particles, and
   a specific surface area of the secondary particles measured by a nitrogen adsorption BET method is 500 $m^2/g$ to 1100 $m^2/g$.

2. The negative electrode of claim 1, wherein the secondary particles comprises a structure in which the graphene sheets are coupled to each other in a chain shape.

3. The negative electrode of claim 1, wherein a lateral size of the graphene sheet is 10 nm to 300 nm.

4. The negative electrode of claim 1, wherein the secondary particles have a value of 0 to 0.2 as calculated by Equation 1 below:

$$\frac{|b-a|}{a} \qquad \text{[Equation 1]}$$

wherein, a is a specific surface area ($m^2/g$) of the secondary particles measured by a nitrogen adsorption BET method and b is an iodine adsorption value (mg/g) of the secondary particles.

5. The negative electrode of claim 1, wherein the secondary particles further comprise a connection portion connected to at least some graphene sheets of the plurality of graphene sheets, wherein the connection portion is in a non-graphene form.

6. The negative electrode of claim 5, wherein at least a portion of each of the plurality of graphene sheets is connected to the connection portion.

7. The negative electrode of claim 1, wherein an average thickness of the graphene sheets is 0.34 nm to 10 nm.

8. The negative electrode of claim 1, wherein a D/G peak ratio is 0.9 to 2.0 when measuring the Raman spectrum for the second particles.

9. The negative electrode of claim 1, wherein the carbon nanotube structures are connected to each other in a net structure in the negative electrode.

10. The negative electrode of claim 1, wherein an average length of the carbon nanotube structure is 1 μm to 500 μm.

11. The negative electrode of claim 1, wherein an average length of the carbon nanotube structure is 6 μm to 20 μm.

12. The negative electrode of claim 1, wherein an average diameter of the carbon nanotube structure is 2 nm to 200 nm.

13. The negative electrode of claim 1, wherein the carbon nanotube structure is a carbon nanotube structure in which 15 to 50 single-walled carbon nanotube units are coupled to each other.

14. The negative electrode of claim 1, wherein a weight ratio of the secondary particles to the carbon nanotube structure is 100:1 to 100:200.

15. The negative electrode of claim 1, wherein the negative electrode active material layer further comprises carboxy methyl cellulose.

16. The negative electrode of claim 15, wherein a weight average molecular weight of the carboxy methyl cellulose is 50,000 g/mol to 500,000 g/mol.

17. The negative electrode of claim 15, wherein a degree of substitution of the carboxy methyl cellulose is 0.1 to 3.

18. The negative electrode of claim 1, wherein the conductive material further comprises a multi-walled carbon nanotube unit.

19. A secondary battery comprising the negative electrode of claim 1.

20. The negative electrode of claim 1, wherein the carbon nanotube structure is included in the negative electrode active material layer in an amount of an 0.01 wt % to 1.0 wt %.

* * * * *